(12) United States Patent
Siomina et al.

(10) Patent No.: US 9,526,031 B2
(45) Date of Patent: Dec. 20, 2016

(54) METHOD AND ARRANGEMENT FOR HANDLING MEASUREMENTS UNDER DYNAMICALLY CONFIGURED PATTERNS

(75) Inventors: Iana Siomina, Solna (SE);
Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 94 days.

(21) Appl. No.: 14/238,903

(22) PCT Filed: Jul. 6, 2012

(86) PCT No.: PCT/SE2012/050809
§ 371 (c)(1),
(2), (4) Date: Feb. 14, 2014

(87) PCT Pub. No.: WO2013/025160
PCT Pub. Date: Feb. 21, 2013

(65) Prior Publication Data
US 2014/0200016 A1 Jul. 17, 2014

Related U.S. Application Data

(60) Provisional application No. 61/523,694, filed on Aug. 15, 2011.

(51) Int. Cl.
*H04W 28/20* (2009.01)
*H04W 24/08* (2009.01)
(Continued)

(52) U.S. Cl.
CPC ............. *H04W 28/20* (2013.01); *H04W 24/08* (2013.01); *H04W 24/10* (2013.01); *H04W 36/30* (2013.01)

(58) Field of Classification Search
CPC ...... H04W 28/20; H04W 24/08; H04W 24/10; H04W 36/30
(Continued)

(56) References Cited

U.S. PATENT DOCUMENTS

2009/0196250 A1 8/2009 Feng et al.
2010/0136920 A1* 6/2010 Shrivastava .......... H04W 28/06
455/67.11
(Continued)

FOREIGN PATENT DOCUMENTS

EP 0 949 830 10/1999
EP 2 683 191 A1 1/2014
(Continued)

OTHER PUBLICATIONS

PCT Notification of Transmittal of the International Search Report and the Written Opinion of the International Searching Authority, or the Declaration for International Application No. PCT/SE2012/050809; International Filing Date Jul. 6, 2012.
(Continued)

*Primary Examiner* — Michael Mapa
(74) *Attorney, Agent, or Firm* — Baker Botts, LLP

(57) ABSTRACT

The present disclosure relates to a method in a measuring node and a measuring node for handling measurements performed on signals received over a wireless interface in a wireless communication system. The method comprises performing (202) measurements on the received signals according to a first measurement configuration, detecting (204) that a change from the first measurement configuration to a second measurement configuration has occurred, performing (206) measurements on the received signals according to the second measurement configuration, and using (210) the measurements performed according to the first measurement configuration and the measurements performed according to the second measurement configuration for radio resource management tasks. At least one of the first measurement configuration and the second measurement configuration comprises a signal activity pattern.

19 Claims, 13 Drawing Sheets

(51) Int. Cl.
*H04W 24/10* (2009.01)
*H04W 36/30* (2009.01)

(58) Field of Classification Search
USPC ............ 455/115.1–115.4, 226.1, 450–452.1; 370/332
See application file for complete search history.

(56) References Cited

U.S. PATENT DOCUMENTS

| | | | |
|---|---|---|---|
| 2010/0279679 A1 | 11/2010 | Young et al. | |
| 2010/0279682 A1* | 11/2010 | Rangaiah | H04W 36/0088 455/426.1 |
| 2012/0202480 A1* | 8/2012 | Franklin et al. | 455/423 |

FOREIGN PATENT DOCUMENTS

| | | | | |
|---|---|---|---|---|
| SE | WO 2009096846 A1 * | 8/2009 | ............ | H04W 24/10 |
| WO | WO 2008/043560 | 4/2008 | | |
| WO | WO 2009/096845 | 8/2009 | | |
| WO | WO 2009/096846 | 8/2009 | | |
| WO | WO2009/096846 A1 * | 8/2009 | | |
| WO | WO 2013/025158 | 2/2013 | | |

OTHER PUBLICATIONS

PCT Written Opinion of the International Searching Authority for International Application No. PCT/SE2012/050809; International Filing Date Jul. 6, 2012.

PCT Written Opinion of the International Preliminary Examining Authority for International Application No. PCT/SE2012/050809; International Filing Date Jul. 6, 2012.

PCT International Preliminary Report on Patentability for International Application No. PCT/SE2012/050809; International Filing Date Jul. 6, 2012.

3GPP TSG-RAN WG2#55 in Seoul, Korea, Oct. 9-13, 2006 (R2-062928).

3GPP TSG-RAN WG2 Meeting #72 in Jacksonville, USA, Nov. 15-19, 2010 (R2-106449).

3GPP TSG-RAN WG4 Meeting #59 in Barcelona, Spain May 9-13, 2011 (R4-112667).

International Search Report for International Application No. PCT/SE2012/050809, Jan. 30, 2013.

Mexican Office Action issued for Mexican Patent Appln.: MX/a/2014/001533 (English translation attached), Nov. 6, 2014.

U.S. Appl. No. 61/522,810, filed Aug. 12, 2011, Baldemair.

* cited by examiner

Aggregated bandwidth e.g. 90 MHz and 10, 20 MHz

Aggregated bandwidth of e.g. 20 MHz and 5 MHz

METHOD AND ARRANGEMENT FOR HANDLING MEASUREMENTS UNDER DYNAMICALLY CONFIGURED PATTERNS

This non provisional application is a U.S. National Stage Filing under 35 U.S.C. §371 of International Patent Application Serial No. PCT/SE2012/050809, filed Jul. 6, 2012 and entitled "Methods and Nodes for Handling Measurements in a Wireless Communication System," which claims the benefit of U.S. Provisional Application No. 61/523,694, filed Aug. 15, 2011 and entitled "Method and Arrangement or Handling Measurements Under Dynamically Configured Patterns."

TECHNICAL FIELD

The present disclosure relates generally to telecommunications systems, and in particular, to methods and nodes, for handling measurements in radio communications systems.

BACKGROUND

Radio communication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telephone System (UMTS) which is an existing third generation (3G) radio communication system that is evolving into High Speed Packet Access (HSPA) technology. Yet another alternative is the introduction of a new air interface technology within the UMTS framework, e.g., the so-called Long Term Evolution (LTE) technology. Each new generation, or partial generation, of mobile communication systems add complexity and abilities to mobile communication systems and this can be expected to continue with either enhancements to proposed systems or completely new systems in the future.

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}$=1 ms as shown in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink transmissions are dynamically scheduled, i.e., in each subframe the base station, typically referred to as an eNB in LTE, transmits control information indicating to which terminals and on which resource blocks the data is transmitted during the current downlink subframe. This control signaling is typically transmitted in the first 1, 2, 3 or 4 OFDM symbols in each subframe. A downlink system with 3 OFDM symbols as the control region is illustrated in FIG. 3.

The interest in deploying low-power nodes, such as pico base stations, home eNodeBs, relays, remote radio heads, etc., for enhancing the macro network performance in terms of the network coverage, capacity and service experience of individual users has been constantly increasing over the last few years. At the same time, there has been realized a need for enhanced interference management techniques to address the arising interference issues caused, for example, by a significant transmit power variation among different cells and cell association techniques developed earlier for more uniform networks.

In 3GPP, heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, i.e. small geographical areas with a higher user density and/or higher traffic intensity where installation of pico nodes can be considered to enhance performance. Heterogeneous deployments may also be viewed as a way of densifying networks to adapt to the traffic needs and the environment. However, heterogeneous deployments bring also challenges for which the network has to be prepared to ensure efficient network operation and superior user experience. Some challenges are related to the increased interference in the attempt to increase small cells associated with low-power nodes, also known as cell range expansion.

Regarding interference coordination in heterogeneous networks (HetNets), the so far introduced HetNet solutions for LTE focus on the downlink (DL). The need for enhanced ICIC techniques for DL in such networks is particularly crucial when the cell assignment rule diverges from the Reference Signal Received Power (RSRP)-based approach, e.g. towards pathloss- or pathgain-based approach, sometimes also referred to as the cell range expansion when adopted for cells with a transmit power lower than neighbor cells. The idea of the cell range expansion is illustrated in FIG. 4, where the cell range expansion of a pico cell is implemented by means of a delta-parameter.

To facilitate measurements in the extended cell range, i.e., where high interference is expected, the standard specifies Almost Blank Subframe (ABS) patterns for eNodeBs and restricted measurement patterns for UEs. A pattern is a bit string indicating restricted and unrestricted subframes characterized by a length and periodicity, which are different for FDD and TDD, 40 subframes for FDD and 20, 60 or 70 subframes for TDD.

Restricted measurement subframes are configured to allow the UE to perform measurements in subframes with improved interference conditions, which may be implemented by configuring ABS patterns at eNodeBs, and avoid measuring in high-interference conditions. Restricted measurement patterns are in general UE-specific. Three patterns are currently specified in the standard to enable restricted measurements:

Serving-cell pattern for Radio Link Monitoring (RLM) and RRM measurements;
Neighbor-cell pattern for RRM measurements;
Serving-cell pattern for Channel State Information (CSI) measurements.

ABS pattern is a transmission pattern at the radio node; it is cell-specific and may be different from the restricted measurement patterns signaled to the UE. In a general case, ABS are low-power and/or low-transmission activity subframes. ABS patterns may be exchanged between eNodeBs via X2, but these patterns are not signalled to the UE, unlike the restricted measurement patterns.

In addition to DL patterns, there may also be defined uplink (UL) patterns e.g. for interference coordination purpose.

So far patterns have been described in relation to interference coordination. However, transmission and measurement patterns may also be used for other purposes, e.g., for energy saving or distributed communication schemes, such as CoMP, DAS system, RRU, RRH, any type of multipoint transmission and/or reception system etc.

Radio Resource Management (RRM) measurements are performed to support RRM the purpose of which is to ensure the efficient use the available radio resources and to provide mechanisms that enable evolved UMTS Terrestrial Radio Access Network (E-UTRAN) to meet radio resource related requirements. In particular, RRM in E-UTRAN provides means to manage, e.g. assign, re-assign and release, radio resources taking into account single and multi-cell aspects. Some example RRM functions are radio bearer control, radio admission control, connection mobility control, dynamic resource allocation and packet scheduling, inter-cell interference coordination (ICIC), some Self-Optimized Networks (SON) functions related to radio resources, and load balancing. RRM may be intra-RAT and inter-RAT, and the measurements may be intra-frequency, inter-frequency and inter-RAT.

The RRM measurements are performed by a node such as a UE, collected and used by the network in a centralized or distributed manner.

The example RRM measurements are:
Radio Link Monitoring (RLM) which is based on out of sync and in sync detection of a serving cell,
Cell identification reporting e.g. E-UTRAN cell search, inter-RAT UTRAN cell search, System Information (SI) acquisition, etc.,
UE transmit power or UE power headroom, e.g. difference between max output power and transmitted power on log scale,
Radio node transmit power, e.g., total or for specific channels or signals,
Any signal strength and signal quality in general,
Interference and pathloss measurements,
Timing measurements In LTE, the following timing measurements are standardized in release 9:
1. UE Receive-Transmit (Rx–Tx) time difference,
2. eNodeB Rx–Tx time difference,
3. Timing advance (TA),
4. Reference Signal Time Difference (RSTD),
5. UE Global Navigation Satellite System (GNSS) Timing of Cell Frames for UE positioning,
6. E-UTRAN GNSS Timing of Cell Frames for UE positioning.

In the above list, 1, 2, 3 are timing-based range measurements, for simplicity, also called herein timing measurements, since they reflect the cell range. These measurements are similar to round trip time (RTT) measurements in earlier systems. These measurements are based on both DL and UL transmissions. In particular, for UE Rx–Tx, the UE measures the difference between the time of reception of a DL transmission that occurs after the UE UL transmission and the time of the UL transmission. For eNodeB Rx–Tx, the eNodeB measures the difference between the time of reception of a UL transmission that occurs after the eNodeB DL transmission and the time of the DL transmission.

In addition in LTE there are timing measurements which are implementation dependent and not explicitly standardized; example is:
One way propagation delay: It is measured by eNode B for estimation of timing advance to be signaled to the UE;
There may be a similar UE measurement in the future.

The definitions of the timing measurements in the current LTE standard are given below [TS 36.214].

UE Rx–Tx Time Difference:

| | |
|---|---|
| Definition | The UE Rx – Tx time difference is defined as $T_{UE-RX} - T_{UE-TX}$ <br> Where: <br> $T_{UE-RX}$ is the UE receive timing of downlink radio frame #i from the serving cell, defined by the first detected path in time. <br> $T_{UE-TX}$ is the UE transmit timing of uplink radio frame #i. <br> The reference point for the UE Rx – Tx time difference measurement shall be the UE antenna connector. |
| Applicable for | RRC_CONNECTED intra-frequency | eNB Rx–Tx Time Difference:

| | |
|---|---|
| Definition | The eNB Rx – Tx time difference is defined as $T_{eNB-RX} - T_{eNB-TX}$ <br> Where: <br> $T_{eNB-RX}$ is the eNB receive timing of uplink radio frame #i, defined by the first detected path in time. <br> The reference point for $T_{eNB-RX}$ shall be the Rx antenna connector. <br> $T_{eNB-TX}$ is the eNB transmit timing of downlink radio frame #i. <br> The reference point for $T_{eNB-TX}$ shall be the Tx antenna connector. |

Timing Advance ($T_{ADV}$):

| | |
|---|---|
| Definition | Type1: <br> Timing advance ($T_{ADV}$) type 1 is defined as the time difference <br> $T_{ADV}$ = (eNB Rx – Tx time difference) + (UE Rx – Tx time difference), <br> where the eNB Rx – Tx time difference corresponds to the same UE that reports the UE Rx – Tx time difference. <br> Type2: <br> Timing advance ($T_{ADV}$) type 2 is defined as the time difference <br> $T_{ADV}$ = (eNB Rx – Tx time difference), <br> where the eNB Rx – Tx time difference corresponds to a received uplink radio frame containing PRACH from the respective UE. |

Timing measurements may be used for positioning, e.g. with Enhanced Cell Identity (E-CID), Adaptive Enhanced Cell Identity (AECID), pattern matching, hybrid positioning methods, network planning, SON, eICIC and hetnet, e.g., for optimizing the cell ranges of different cell types, configuration of handover parameters, time coordinated scheduling, etc.

Timing advance is also used to control the timing adjustment of UE UL transmissions. The adjustment is transmitted to the UE in the timing advance command. In LTE, for UEs not supporting LTE Positioning Protocol (LPP), the UE timing adjustment is based on TA Type 2 only.

Most (although not all) of the timing measurements are either positioning measurements or may be used for positioning; however, as explained below positioning measurements are not limited to timing measurements only.

At least the following measurements may be used for positioning in LTE:
  Reference Signal Time Difference (RSTD) for Observed Time Difference Of Arrival (OTDOA) positioning
  Time Of Arrival (TOA) or Time Difference Of Arrival (TDOA) for Uplink Time Difference Of Arrival (UTDOA) positioning (not yet defined for LTE)
  Angle of Arrival (AoA) for UL E-CID
  RSRP, Reference Symbol Received Quality (RSRQ) for DL E-CID
  UE Rx–Tx, eNodeB Rx–Tx and Timing Advance Type 1 and Type 2 for E-CID
  UE GNSS Timing of Cell Frames for UE positioning The measurements are performed by a measuring node, which may also be a UE, and used for determining the location of the LCS target, which may be a UE or a radio node. Positioning may be UE-based, UE-assisted, or network-based, which determines the node performing radio measurements and the node determining the location. For UE-based positioning, the location is determined by the UE and the measurements are typically also collected by the UE. For network-based positioning or UE-assisted, the location is typically determined by the network, e.g., a positioning node, Evolved Serving Mobile Location Centre, E-SMLC, or Serving Location Centre (SLC) in LTE. For UE-assisted positioning, the measurements are performed by the UE and reported to the network node. For network-based positioning, the measurements are performed by radio network nodes.

It is mandatory for all UEs to support all intra-RAT measurements, i.e. inter-frequency and intra-band measurements, and meet the associated requirements. However the inter-band and inter-RAT measurements are UE capabilities, which are reported to the network during the call setup. The UE supporting certain inter-RAT measurements should meet the corresponding requirements. For example a UE supporting LTE and Wideband Code Division Multiple Access (WCDMA) should support intra-LTE measurements, intra-WCDMA measurements and inter-RAT measurements, i.e. measuring WCDMA when serving cell is LTE and measuring LTE when serving cell is WCDMA. Hence the network can use these capabilities according to its strategy. These capabilities are highly driven by factors such as market demand, cost, typical network deployment scenarios, frequency allocation, etc. Inter-frequency and inter-RAT measurements may be performed for RRM, positioning, SON, MDT, etc.

The UE performs inter-frequency and inter-RAT measurements in measurement gaps. The measurements may be done for various purposes: mobility, positioning, self organizing network (SON), minimization of drive tests etc. Furthermore the same gap pattern may be used for all types of inter-frequency and inter-RAT measurements. Therefore E-UTRAN must provide a single measurement gap pattern with constant gap duration for concurrent monitoring, i.e. cell detection and measurements, of all frequency layers and RATs.

In LTE, measurement gaps are configured by the network to enable measurements on the other LTE frequencies and/or other RATs, e.g. UTRAN, Global System for Mobile communication (GSM), CDMA2000, etc. The gap configuration is signaled to the UE over RRC protocol as part of the measurement configuration. Currently, two measurement gap patterns are defined [TS 36.133]: pattern#0 (40 ms) and pattern#1 (80 ms).

In general, in LTE inter-RAT measurements are typically defined similar to inter-frequency measurements, e.g. they may also require configuring measurement gaps similarly to inter-frequency measurements, but often more measurements restrictions and more relaxed requirements are used for inter-RAT measurements. As a special example there may also be multiple networks, which use the overlapping sets of RATs. The examples of inter-RAT measurements specified currently for LTE are UTRAN Frequency Division Duplex (FDD) Common Pilot Channel (CPICH) Received Signal Code Power (RSCP), UTRA FDD carrier Received Signal Strength Indication (RSSI), UTRA FDD CPICH Ec/No, GSM carrier RSSI, and CDMA2000 1× RTT Pilot Strength.

Inter-band measurement refers to the measurement done by the UE on a target cell on a carrier frequency belonging to a frequency band which is different than that of the serving cell. Both inter-frequency and inter-RAT measurements can be intra-band or inter-band.

The motivation of inter-band measurements is that most of the UEs today support multiple bands even for the same technology. This is driven by the interest from service providers; a single service provider may own carriers in different bands and would like to make efficient use of carriers by performing load balancing on different carriers. A well known example is that of multi-band GSM terminal with 800/900/1800/1900 bands.

Furthermore a UE may also support multiple technologies e.g. GSM, UTRA FDD and E-UTRAN FDD. Since all UTRA and E-UTRA bands are common, the multi-RAT UE may support same bands for all the supported RATs.

A multi-carrier system, or interchangeably called carrier aggregation (CA), allows the UE to simultaneously receive and/or transmit data over more than one carrier frequency. Each carrier frequency is often referred to as a component carrier (CC) or simply a serving cell in the serving sector, more specifically a primary serving cell or secondary serving cell. The multi-carrier concept is used in both High Speed Packet Access (HSPA) and LTE. The UE and radio node need, however, to be configured for CA; otherwise, the carriers are seen as another frequency, i.e., inter-frequency or inter-RAT measurements would apply.

Intra-RAT multi-carrier system means that all the component carriers belong to the same RAT e.g. LTE FDD multi-carrier system, LTE TDD multi-carrier system, UTRAN FDD multi-carrier system, UTRAN TDD multi-carrier system and so on.

In LTE multi-carrier system it is possible to aggregate a different number of component carriers of different bandwidths in the UL and the DL as illustrated in FIG. 5.

In a multi-carrier system one of the component carriers is called the anchor carrier and the remaining ones are called the supplementary carriers. Other terminologies used in literature for the anchor and supplementary carriers are primary and secondary carriers, respectively. Yet other commonly known terminologies for the anchor and supplementary carriers are primary serving cell and secondary serving cell respectively. The primary carrier carries all common and UE-specific control channels. The secondary carrier may contain only necessary signaling information and signals, e.g., those that are UE-specific may be not present in the secondary carrier, since both primary uplink and downlink carriers are typically UE specific. This means that different UEs in a cell may have different downlink primary carriers. This is true also for the uplink primary carriers. The network is able to change the primary carrier of the UE at any time, e.g. for interference coordination or load balancing purpose.

The component carrier may be contiguous or non-contiguous, as shown in FIG. 2. Furthermore in case of non-contiguous carriers, they may belong to the same frequency band or to different frequency bands. A hybrid carrier aggregation scheme comprising contiguous and non-contiguous component carriers are also envisaged in LTE.

A scenario comprising of 5 contiguous component carriers each of 20 MHz (i.e. 5×20 MHz) is being considered for LTE TDD. Similarly for LTE FDD a scenario comprising of 4 contiguous component carriers each of 20 MHz (i.e. 4×20 MHz) in the downlink and 2 contiguous component carriers in the uplink is being studied.

Other carrier types may also be defined in the future.

However, there remain a number of problems associated with standardized approaches to handling measurements and measurement patterns, which problems are discussed in more detail below.

ABBREVIATIONS

3GPP 3$^{RD}$ GENERATION PARTNERSHIP PROJECT
BS BASE STATION
COMP COORDINATED MULTIPOINT TRANSMISSION AND RECEPTION
CRS CELL-SPECIFIC REFERENCE SIGNAL
DAS DISTRIBUTED ANTENNA SYSTEM
eICIC enhanced ICIC
eNodeB evolved Node B
ICIC INTER-CELL INTERFERENCE COORDINATION
LTE LONG-TERM EVOLUTION
MDT MINIMIZING DRIVE TEST
PCI PHYSICAL CELL IDENTITY
RAN Radio Access Network
RAT Radio Access Technology
RB Resource Block
RE Resource Element
RRC Radio Resource Control
RRM Radio Resource Management
RRH Remote radio head
RRU Radio Remote Unit
SINR Signal-to-Interference-plus-Noise Ratio
SNR Signal-to-Noise Ratio
SON Self-Optimized Network
UE USER EQUIPMENT
UMTS UNIVERSAL MOBILE TELECOMMUNICATIONS SYSTEM

SUMMARY

It is an object of the invention to address at least some of the problems and issues outlined above. It is a further object to make more efficient use of measurements to improve UE and/or network performance. It is possible to achieve these objects and others by using a method and an apparatus as defined in the attached independent claims.

According to a first aspect, a method in a measuring node for handling measurements performed on signals received over a wireless interface in a wireless communication system is provided. The method comprises performing measurements on the received signals according to a first measurement configuration; detecting that a change from the first measurement configuration to a second measurement configuration has occurred and performing measurements on the received signals according to the second measurement configuration. At least one of the first measurement configuration and the second measurement configuration comprises a signal activity pattern. The method further comprises using the measurements performed according to the first measurement configuration and the measurements performed according to the second measurement configuration for radio resource management tasks.

Embodiments of this invention deals with defining a rule for the measuring node of how to use measurements performed before and after a change of measurement configuration. The method may therefore further comprise identifying how to use the measurements performed according to the first measurement configuration and the measurements performed according to the second measurement configuration according to a defined measurement-related rule pertaining to handling of measurements. By defining such a rule, measurements on radio signals can be more efficiently utilized, which results in improved communication control, such as more efficient use of radio resources.

According to a second aspect, a measuring node is provided for handling measurements performed on signals received over a wireless interface in a wireless communication system. The measuring node comprises a measuring unit arranged to perform measurements on received signals according to a first measurement configuration, and to perform measurements on received signals according to a second measurement configuration. At least one of the first measurement configuration and the second measurement configuration comprises a signal activity pattern. The measuring node further comprises a processor for detecting a change from the first measurement configuration to the second measurement configuration, and for using the measurements performed according to the first measurement configuration and the measurements performed according to the second measurement configuration for radio resource management tasks.

According to a third aspect, a method is provided in a network node for controlling a change of signal activity pattern for signals transmitted from the network node to a measuring node. The method comprises instructing the measuring node or a transmit unit of the network node to start using a first signal activity pattern for signals transmitted to the measuring node, analyzing measurement behavior of the measuring node, and instructing the measuring node or a transmit unit of the network node to start using a second signal activity pattern based on the analysis.

According to a fourth aspect, a network node is provided for controlling a change of signal activity pattern for signals transmitted from the network node to a measuring node. The network node comprises a processor arranged for instructing the measuring node or a transmit unit of the network node to start using a first signal activity pattern for signals transmitted to the measuring node, analyzing measurement behaviour of the measuring node, and instructing the measuring node or a transmit unit of the network node to start using a second signal activity pattern based on the analysis.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
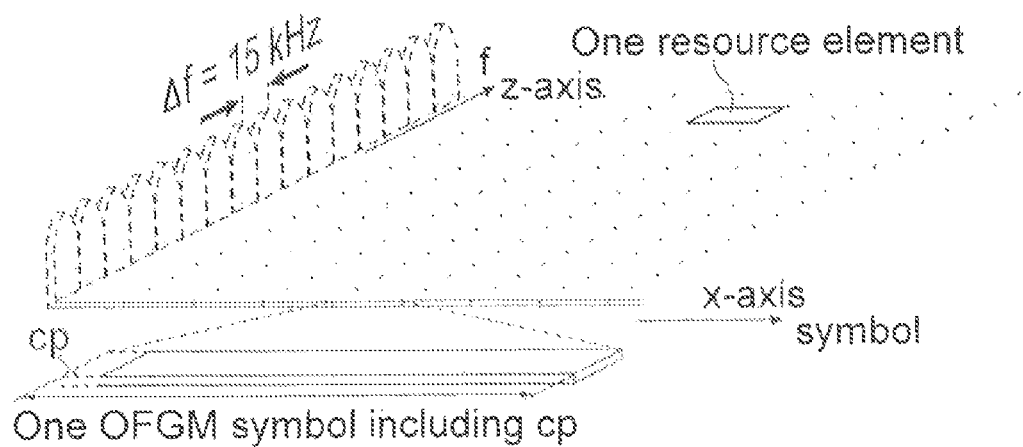
FIG. 1 is a schematic diagram illustrating the LTE time-frequency grid.
Figure 2:
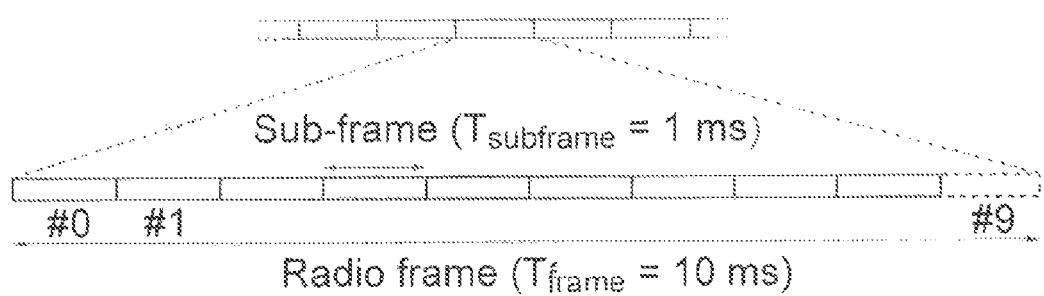
FIG. 2 is a schematic diagram illustrating the LTE frame structure.
Figure 3:
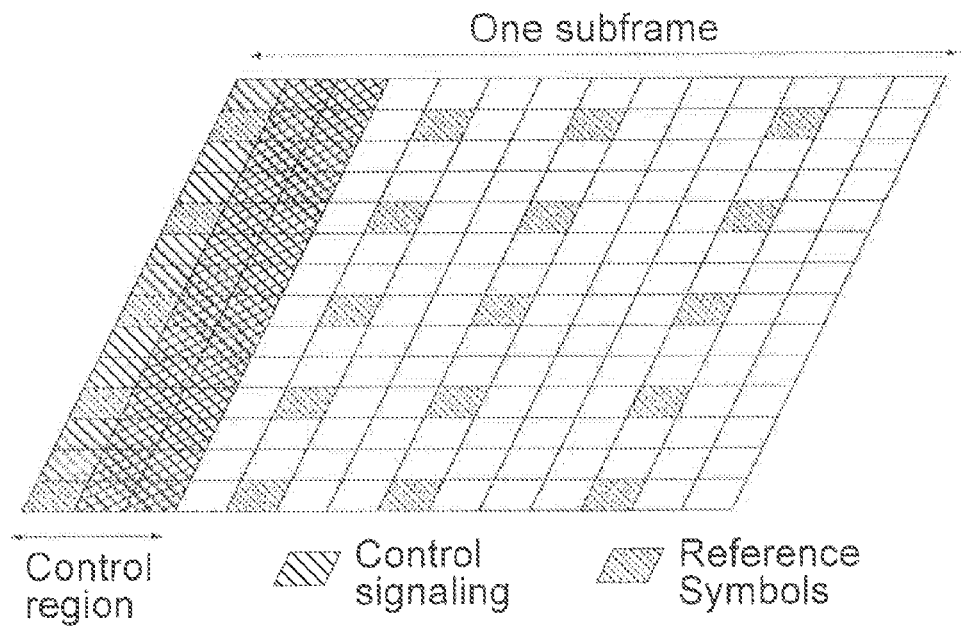
FIG. 3 is a schematic diagram illustrating an LTE subframe.
Figure 4:
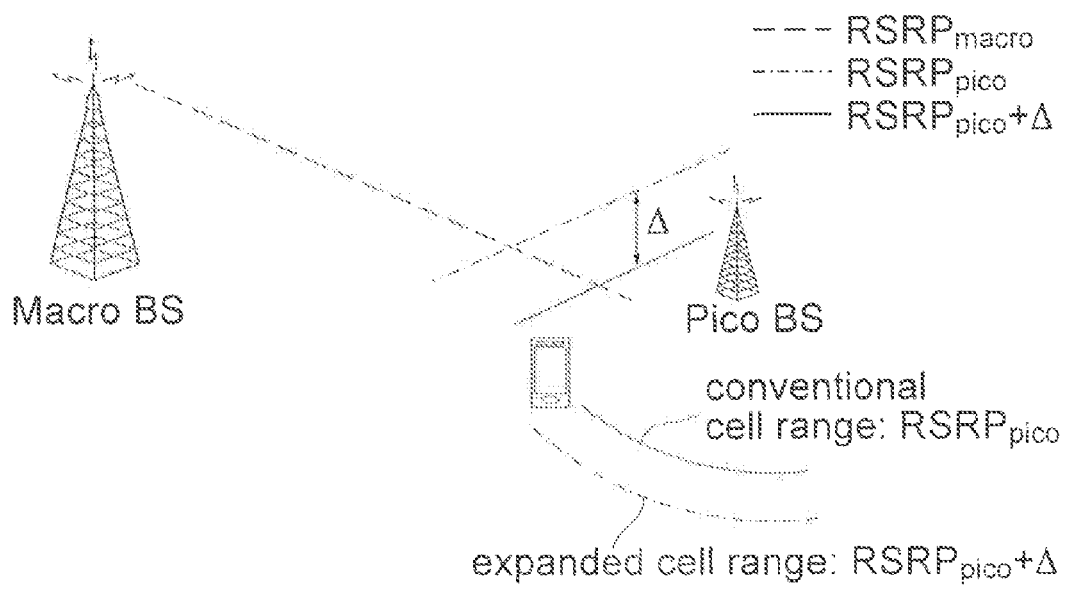
FIG. 4 is a schematic diagram illustrating cell range expansion in heterogeneous networks.
Figure 5:
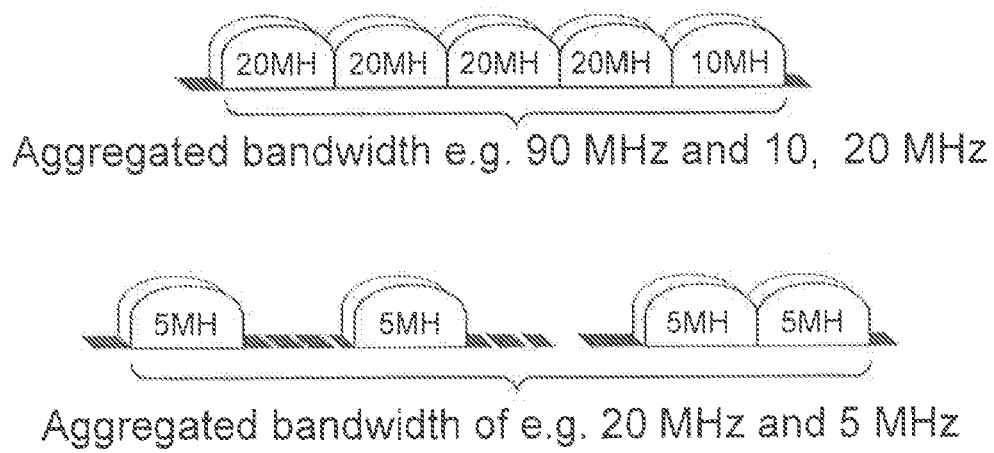
FIG. 5 is a schematic diagram illustrating carrier aggregation.

The following detailed description of the example embodiments refers to the accompanying drawings. The same reference numbers in different drawings identify the same or similar elements. Also, the following detailed description does not limit the invention. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The terms "initial configuration"/"first configuration" and "new configuration"/"second configuration" are used in an interchangeable manner throughout this disclosure. The term "initial/first configuration" represents a measurement configuration used in a first state, i.e. a state that prevails before a state transition to a different measurement configuration occurs. Further, the term "new/second" configuration represents a measurement configuration used in a second state, i.e. a state that prevails after a state transition from the first state to a different measurement configuration has occurred. A measuring node may be e.g. a UE, an eNodeB, a radio measurement unit or a location measurement unit.

As mentioned above, a number of problems with previous solutions have been identified including, for example:

For ICIC, the standard allows for configuring measurement resource restriction patterns for neighbour cell measurements. When the primary or serving cell changes, the serving cell pattern may also change. Further, the neighbour cell pattern may or may not also change. It is not straightforward how to define the requirements for the neighbour cell measurements in these cases.

It has been discussed that measurement resource restriction patterns may be used for timing measurements. However, it is not straightforward how to define the requirements when the patterns are dynamically configured or updated.

The measurement behaviours, measurement requirements and transmit pattern configuration requirements under dynamic pattern configuration are undetermined The details of pattern configuration for inter-frequency or inter-RAT measurements are unclear Unclear measurement behaviours and measurement reporting when pattern reconfiguration occurs due to a cell change.

Accordingly, to address these problems, exemplary embodiments address, for example, at least some of the following aspects:

Methods and signaling means to ensure measurement behavior and measurement requirements under dynamic pattern configuration In general, For specific measurements, e.g., RRM, timing, positioning and resource assignment measurements, In specific conditions, e.g., under cell change to unknown cell, When inter-frequency measurements are configured Methods for configuring transmit and measurement patterns and methods to ensure measurement behavior when inter-frequency measurements are configured, with or without dynamic pattern configuration.

Methods in a network node for pattern configuration while accounting for the measurement behavior.

Figure 6:
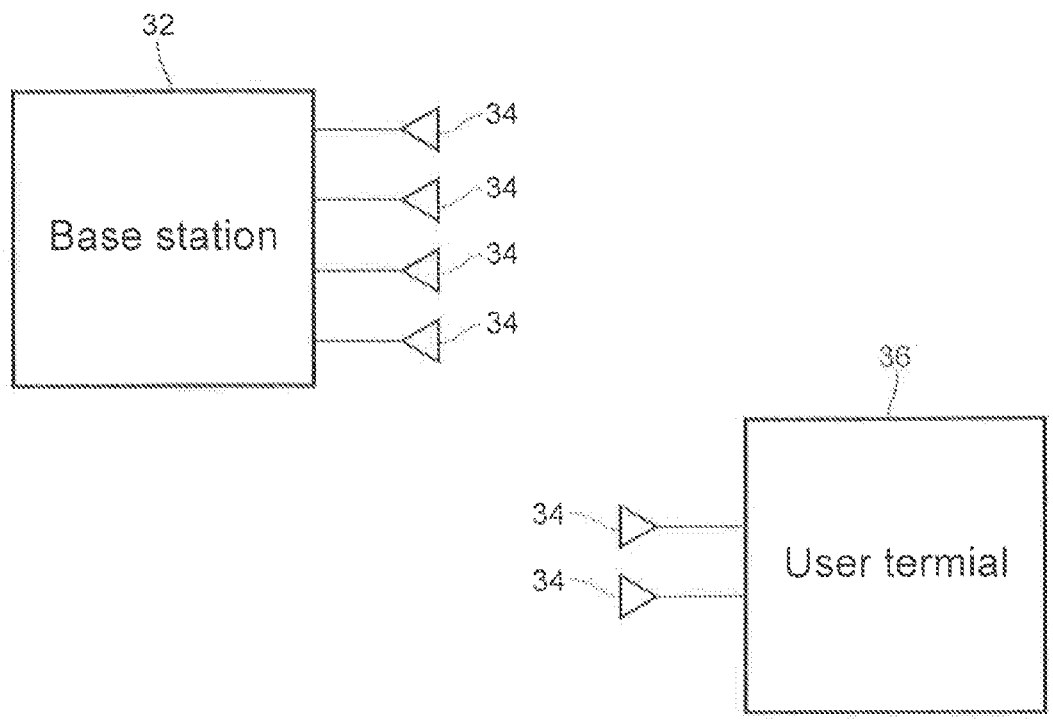
FIG. 6 is a schematic block diagram illustrating a base station and a user terminal (a.k.a. user equipment).
Figure 7:
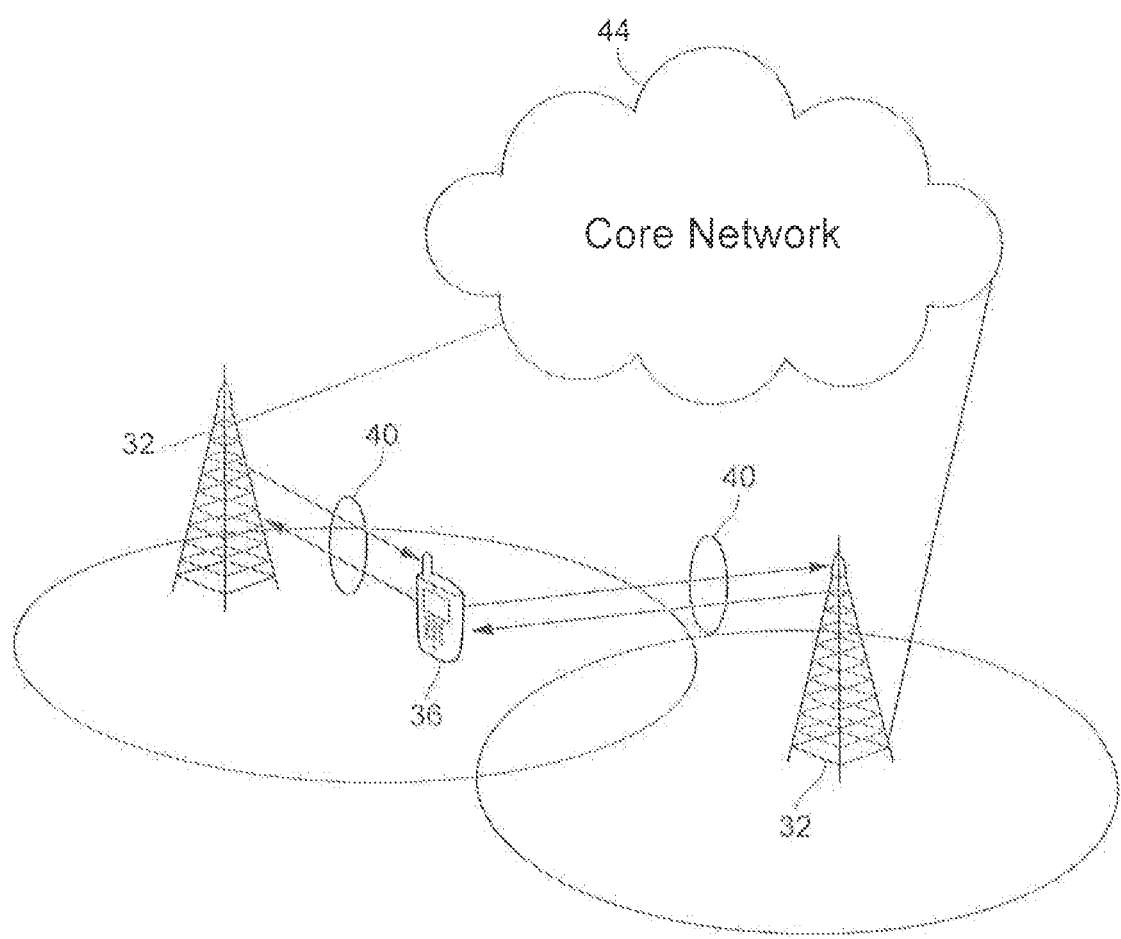
FIG. 7 is a schematic diagram showing a scenario in a radio communications network.

To provide some context for the following example embodiments related to measurements and measurement patterns, consider the example radio communication system as shown from two different perspectives in FIGS. 6 and 7, respectively. To increase the transmission rate of the systems, and to provide additional diversity against fading on the radio channels, modern wireless communication systems include transceivers that use multi-antennas, often referred to as a MIMO systems. The multi-antennas may be distributed to the receiver side, to the transmitter side and/or provided at both sides as shown in FIG. 6. More specifically, FIG. 6 shows a base station 32 having four antennas 34 and a user terminal, also referred to herein as "user equipment" or "UE", 36 having two antennas 34. The number of antennas shown in FIG. 6 is an example only, and is not intended to limit the actual number of antennas used at the base station 32 or at the user terminal 36 in the example embodiments to be discussed below.

Additionally, the term "base station" is used herein as a generic term. As will be appreciated by those skilled in the art, in the LTE architecture an evolved NodeB (eNodeB) may correspond to the base station, i.e., a base station is a possible implementation of the eNodeB. However, the term "eNodeB" is also broader in some senses than the conventional base station since the eNodeB refers, in general, to a logical node. The term "base station" is used herein as inclusive of a base station, a NodeB, an eNodeB or other nodes specific for other architectures. An eNodeB in an LTE system handles transmission and reception in one or several cells, as shown for example in FIG. 7.

FIG. 7 shows, among other things, two eNodeBs 32 and one user terminal 36. The user terminal 36 uses dedicated channels 40 to communicate with the eNodeB(s) 32, e.g., by transmitting or receiving RLC PDU segments as according to example embodiments described below. The two eNodeBs 32 are connected to a Core Network 44.

Figure 8:
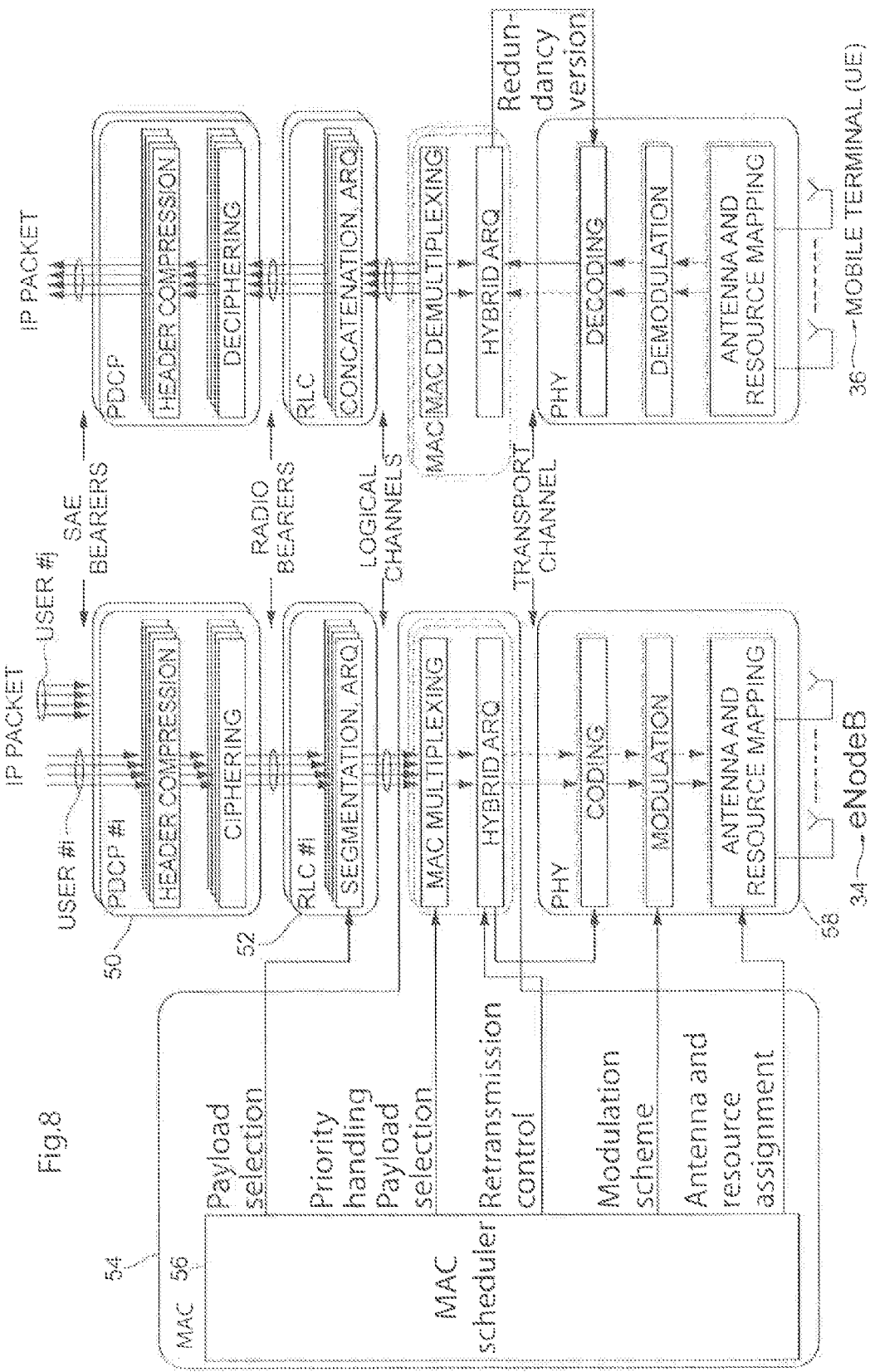
FIG. 8 is a schematic block diagram illustrating processing of data packets in LTE.

One example LTE architecture for processing data for transmission by an eNodeB 32 to a UE 36 (downlink) is shown in FIG. 8. Therein, data to be transmitted by the eNodeB 32, e.g., IP packets, to a particular user is first processed by a packet data convergence protocol (PDCP) entity 50 in which the IP headers are, optionally, compressed and ciphering of the data is performed. The radio link control (RLC) entity 52 handles, among other things, segmentation of, and/or concatenation of, the data received from the PDCP entity 50 into protocol data units (PDUs). Additionally, the RLC entity 52 provides a retransmission protocol (ARQ) which monitors sequence number status reports from its counterpart RLC entity in the UE 36 to selectively retransmit PDUs as requested. The medium access control (MAC) entity 54 is responsible for uplink and downlink scheduling via scheduler 56, as well as the hybrid-ARQ processes discussed above. A physical (PHY) layer entity 58 takes care of coding, modulation, and multi-antenna mapping, among other things. Each entity shown in FIG. 8 provides outputs to, and receives inputs from, their adjacent entities by way of bearers or channels as shown. The reverse of these processes are provided for the UE 36 as shown in FIG. 8 for the received data, and the UE 36 also has similar transmit chain elements as the eNB 32 for transmitting on the uplink toward the eNB 32, as will be described in more detail below.

Having described some example LTE devices in which aspects of measurement and measurement patterns according to example embodiments can be implemented, the discussion now returns to consideration of these measurement topics.

The methods, devices and systems disclosed herein are described with primary focus on heterogeneous deployments, which, however, shall neither be viewed as a limitation of the invention nor shall be limited to the 3GPP definition of heterogeneous network deployments. For example, the methods could be well adopted also for traditional macro deployments and/or networks operating more than one radio access technology (RAT).

The signaling described in the invention is either via direct links or logical links, e.g. via higher layer protocols and/or via one or more network nodes. For example signaling from a coordinating node may pass another network node, e.g., a radio node. Although the invention embodiments address co-channel interference coordination in UL and described for single-frequency networks, it is straightforward that the embodiments may also be applied for multi-carrier and multi-frequency networks. In this case, the disclosed signaling means such as patterns may be additionally associated with a frequency or carrier and this information may also be signaled.

Although the description is given for UE, as a measuring unit, it should be understood by the skilled in the art that "UE" is a non-limiting term which means any wireless device or node, e.g. PDA, laptop, mobile, sensor, fixed relay, mobile relay or even a radio node equipped with UE interface such as femto base station.

A cell is associated with a radio node, where a radio node or radio network node or eNodeB used interchangeably in the invention description, comprises in a general sense any node transmitting and receiving radio signals used for measurements, e.g., eNodeB, macro/micro/pico base station, home eNodeB, relay, or repeater. The micro eNode B is also interchangeably known as medium range eNode B. A radio node herein may comprise a radio node operating in one or more frequencies or frequency bands. It may be a radio node capable of CA. It may also be a single- or multi-RAT node which may e.g. support multi-standard radio (MSR) or may operate in a mixed mode.

Multiple serving cells are possible with carrier aggregation, so "a serving cell" is in general used throughout the description for CA and non-CA systems. With CA, primary cell is an example of a serving cell.

A radio node may also be a node which is not configured with or assigned a cell of its own, but still receives UL radio signals and performs UL measurements, e.g., a measurement unit such as a Location Measurement Unit (LMU) or a radio node sharing the cell ID with another radio node.

The term "centralized network management node" or "coordinating node" used herein is a network node which may also be a radio network node which coordinates radio resources with one or more radio network nodes. Other examples of the coordinating node are network monitoring and configuration node, OSS node, O&M, MDT node, SON node, positioning node, a gateway node such as Packet Data Network Gateway (P-GW) or Serving Gateway (S-GW) network node or femto gateway node, etc.

The embodiments of this disclosure are not limited to LTE, but may apply with any Radio Access Network (RAN), single- or multi-RAT. Some other RAT examples are LTE-Advanced, UMTS, GSM, cdma2000, WiMAX, and WiFi.

An activity pattern describes a UE or a radio node activity related to any one of transmitting radio signals, receiving radio signals and performing radio measurements. The patterns concerned by the current invention may be transmit patterns or measurement patterns. A transmit pattern, also known as a signal transmit pattern, would typically describe transmissions of signals, e.g., physical signals such as synchronization signals or reference signals, or channels, e.g. Random Access Channel (RACH) or Physical Downlink Control Channel (PDCCH), in one cell, in contrast to a measurement pattern which indicates when measurements are to be performed. A transmit pattern is associated with a transmitter. Further, the transmit pattern may relate to transmitting cell-specific or UE-specific signals. For cell-specific signals, the transmit pattern is the same for all UEs at each specific point of time. Different cells may have different patterns. A transmit pattern may be applicable to UL or DL transmissions. A transmit pattern may indicate e.g. ON/OFF transmit periods or full/reduced transmit power periods. A non-limiting example of a transmit pattern is an ABS pattern defined for interference coordination. In another example, a transmit pattern relates to energy efficiency. A transmit pattern may be defined for one or more signals or channels and may be associated with one or more measurement types.

A measurement pattern is used for performing UL, DL or combined UL/DL measurements by a UE or a radio node. For example, a UE performs measurements on DL signals using a DL measurement pattern. In another example, a radio node performs measurements according to a UL measurement pattern on signals transmitted by a UE. An example of a combined measurement is Rx–Tx measurement which comprises measuring on DL and UL signals and/or channels. A measurement pattern defined for a measuring node would typically indicate a subset of time and/or frequency resources on which the measured signal may be measured. A measurement pattern may be defined for one or more signals or channels and may be associated with one or more measurement types. An example of a measurement pattern is any of the measurement resource restriction patterns defined for interference coordination, e.g., the serving cell measurement resource restriction pattern for RLM and RRM, namely RSRP/RSRQ, measurements [3GPP TS 36.331]. In another example, a measurement pattern may be related to energy efficiency. The pattern may also be associated with a specific carrier type or cell type, also known as additional carrier or cell type. For example an additional carrier type may specifically be defined for one or more specific purposes e.g. for energy saving, for machine type communication, also known as machine to machine communication, for heterogeneous network, e.g., an escape or low-interference carrier, for spectral efficiency, for lower signaling overheads etc. The pattern can therefore be tagged with the carrier type, i.e. with an associated indicator.

A focus of these embodiments may be measurement patterns. However, it has to be noted that there is a relation between a transmit pattern of a measured signal and measurement pattern, since a measurement pattern would typically not indicate a measurement on a signal/channel which is not transmitted, but on the other hand not necessarily every transmit occasion may be indicated for measurements. Further, a transmit pattern may indicate transmission activity of one or more signals/channels other than that which is to be measured, e.g., RLM measurements are performed on CRS, the signals which are always transmitted in normal subframes, whilst a measurement resource restriction pattern indicates only a subset of subframes for RLM measurements. In this case, the transmit pattern may characterize the interference, and a measurement pattern is likely to overlap with resources when the interfering signal is not transmitted. It is thus not precluded by the current invention that the measuring node (UE or eNodeB) is also aware of a transmit pattern.

A pattern may be characterized e.g. by any of or a combination of: pattern sequence, for example a bit string where a 1/0 bit indicates whether to measure or not measure in the associated time instance which may be a subframe, a slot, a symbol or any other time instance, periodicity, density, reference time point, etc.

Dynamic pattern configuration comprises pattern configuration at a node transmitting or receiving radio signals resulting in one or more state transitions, where the stated transition are defined in more detail below.

The dynamic configuration of the pattern performed by the network node while the measurements are ongoing can happen in any of the following scenarios: Dynamic pattern configuration without cell change, Dynamic pattern configuration due to a cell change.

The dynamic pattern configuration may also be performed by a UE, e.g., triggered by some event, e.g., upon an indication received from the network, upon a change in interference conditions determined by the UE, or upon a cell change. The UE may also be pre-configured with one or more patterns by the network e.g. hard coded in the UE or preconfigured by the serving eNB. The condition(s) for dynamic pattern configuration can also be pre-configured, e.g., hard coded in the UE or pre-configured by the network; for example, in terms of serving cell and/or neighbor cell signal threshold level. The conditions can be different or same for different types of measurements and also different or common for DL and UL patterns. When certain condition (s) is met, the UE may autonomously configure the pattern or select an appropriate pattern or de-configure an already configured pattern. The UE may also be allowed to do autonomous pattern configuration if it can meet the measurement requirements by changing the pattern. For example if the UE can meet requirements with a coarser pattern, e.g. a pattern with a fewer or less frequent measurement occasions, then it may change the pattern.

If the UE dynamically changes the pattern, then the UE may also send an indication to the network node. The indication sent to the network can be implicit i.e. UE informs that certain condition is triggered; the condition may map to a certain pattern. The indication can also be explicit i.e. UE informs about the configured pattern, which can be the pattern identifier or similar information. This will enable the network to be aware which pattern is used and will also allow the network to interpret the measurement results reported by the UE. The information may also be used by the network for network planning, SON, configuration, setting of system parameters, configuration of patterns etc.

The embodiments related to the above scenarios are described in the next portions of this disclosure.

Considering a first embodiment associated with dynamic pattern configuration without cell change, the following three transition states may occur when e.g. the UE or network nodes are not static and/or the patterns are not statically configured:

1. Pattern configuration during ongoing measurements—a pattern is received after the measurements have been started and no pattern has been used before this. The measurements are not completed prior to the configuration of the pattern.

The situation may occur e.g. when a UE is entering an area where a pattern needs to be used to facilitate or maintain measurements, where an example area may be cell range expansion area, without the cell change, or a Closed Subscriber Group (CSG) coverage area. Before entering the area the UE has not been using measurement patterns. The pattern may also be configured by the network in case the radio conditions change due to the variation in the system load, new interferer, user speed etc. One or more of these factors may in turn increase the interference thus calling for the need for pattern based measurements. Another example situation when this transition type may occur is when the signal strength difference of a serving and another cell changes, e.g. RXserv–Rx [dB] becomes lower than a threshold.

2. Pattern reconfiguration during ongoing measurement—a new pattern is configured during the timing measurements, while another pattern has been used before the new pattern.

The situation may occur e.g. when a transmit pattern is changed at a radio node and as a result an affected UE receives the new pattern configuration. In another example, the pattern reconfiguration transition state may also occur when the interferer or the character of the interference changes which may require other time occasions for measurement or result in some changes e.g. in the pattern density, for example an increase or decrease in the number of time occasions indicated for measurements. The pattern may also be changed in accordance with the change of the UE location with respect to the aggressor cell. In a special case, reconfiguration may comprise changing of at least one aspect of pattern configuration, e.g. changing of the associated cell which is covered in more detail below, reference time, measurement interval, carrier frequency, etc., without changing the measurement occasions.

Further, it may be an explicit or implicit pattern reconfiguration. An example of the explicit pattern reconfiguration is receiving a new pattern from a network node. An example of an implicit pattern reconfiguration is when no new pattern is received but an event in the UE triggered autonomous adjustment of measurements performed using the pattern. For example, the UE needs to read system information (SI) periodically and there is currently no requirement on simultaneous measurements and SI reading on broadcast channel so the UE may choose to perform SI reading instead of performing a measurement in the subframe indicated for measurements by the pattern. This is further complicated due to the fact that the UE is also expected to receive the data from the serving cell. Therefore reception of the data channel in parallel with SI reading of a neighbor cell and neighbor cell measurements is typically not possible.

Another example of an implicit pattern reconfiguration is when the UE is configured with measurement gaps during the ongoing measurements such that the gaps overlap at least in part with the time instances indicated for measurements by the pattern. In this case the overlapping parts of the measurement occasions may not be used for measurements any more.

Yet another example of an implicit pattern reconfiguration is when the UE is configured with a new DRX configuration during the on-going measurement. Although DRX configuration may determine some sort of pattern, which may be configured by the network and sent to the UE, the pattern reconfiguration may be viewed also as implicit with respect to the measurement pattern configured for the UE which is not changed but gets impacted by the new DRX configuration. In one embodiment, the network may delay configuring DRX until the measurement is finished.

3. Pattern release during ongoing measurement—the configured pattern that has been used during the measurements is not used any more.

The situation may occur e.g. when the UE enters an area, without changing the cell, where the pattern is not needed or the radio node has stopped using the pattern. This may occur in several scenarios such as when there is no more a UE in a CSG coverage area or when there is no strong aggressor cell causing any significant interference towards the victim UE. Another example situation when this transition type may occur is when the signal strength difference of a serving and another cell changes, e.g., RXserv-Rx [dB] becomes higher than a threshold.

Figure 9:
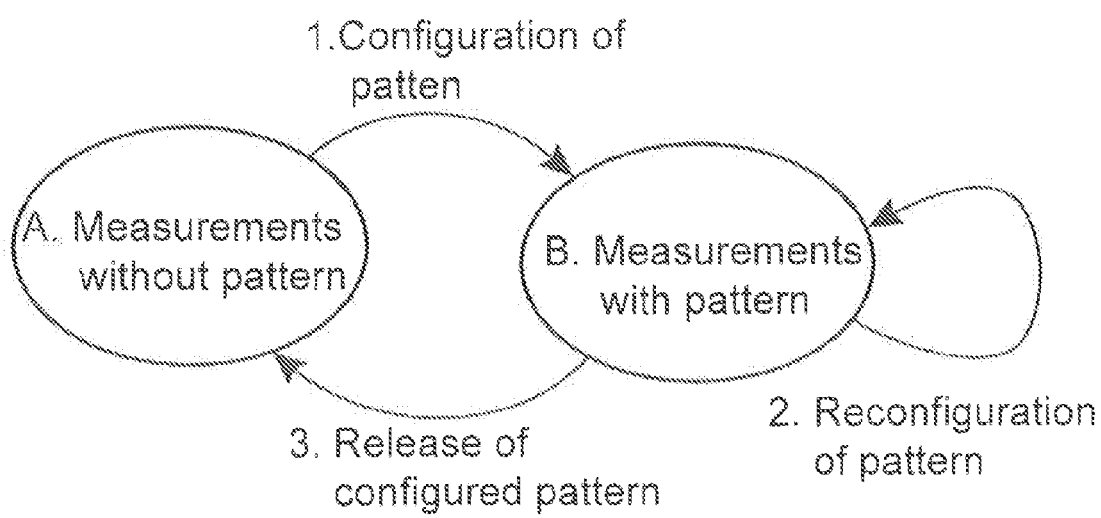
FIG. 9 is a flow chart depicting state transitions.

The transition states are depicted in FIG. 9, where three transition states (1, 2, and 3) and two steady states (A and B) are shown. More specifically, FIG. 9 illustrates transition between two steady states: steady state A in which a measurement is done without pattern (i.e. legacy) and steady state B in which a measurement is done using a pattern.

To generalize the three transition types, the following new terminology is introduced. The term "initial configuration" is used herein to indicate the initial steady state prior to the transition. The term "new configuration" is used herein to indicate the final steady state of a transition. The "state transition" is used herein to refer to a process or a state during the process of the transition from the initial configuration to the new configuration. As an example the initial and new configurations can be configured for measurements over any two successive time periods during the measurement session. The successive time periods, however, may or may not be consecutive or adjacent, e.g., because the transition state may also take some time or state change may be triggered with a delay, i.e., not immediately.

It is noted that when multiple transitions occur, there may be multiple initial configurations and multiple new configurations. For example, after the first transition but before the second transition the new configuration of the former becomes the initial configuration of the latter.

It is also noted that with a state transition also the received signal level and/or the received signal quality may change.

It is also noted that dynamically configuring may mean dynamically configuring any one of: only a DL pattern, only an UL pattern, both an UL pattern and a DL pattern.

TABLE 1

The terminology relations for the three transition types

|  | Initial configuration | New configuration |
|---|---|---|
| State transition #1 | Steady state A | Steady state B |
| State transition #2 | Steady state B | Steady state B |
| State transition #3 | Steady state B | Steady state A |

Considering now dynamic pattern configuration due to a cell change, any of the three state transition types described above may also occur due to a cell change, where the cell change may be a result of one or more of the following actions or procedures:

Handover, e.g. due to UE mobility, cell load balancing or other reason, where the handover may be intra-frequency, inter-frequency or inter-RAT, RRC connection establishment, e.g., going from IDLE state to CONNECTED state where UE connects to the camped cell or to a new target cell, RRC connection re-establishment, RRC connection release with redirection to a new target cell, Link modification or update in multi-point transmission and/or reception, CoMP, DAS systems, etc., Primary carrier change or primary cell change in carrier aggregation (CA), Change in any of the serving cell e.g. secondary cell change in CA for measurements done on cells on secondary carriers, Cell selection in idle state, Cell re-selection in idle or low activity state, e.g. dormant state.

After cell change the UE may be configured with a pattern which is the same or different compared to the pattern used prior to the cell change. Note also that not using a pattern in an initial or new configurations is a special scenario associated with the first and third transition types also covered by this embodiment. In both cases, i.e. the case where the pattern is the same and the case where the pattern is different, there is a transition. For example in the former case, i.e. the same pattern before and after, the steady state B occurs and thus measurement behavior under dynamic pattern configuration, described in later sections, applies.

Considering now some signaling mechanisms for enhancing measurement performance with dynamic pattern configuration due to a cell change, a new configuration is provided to a measuring node in a handover command, which may reduce the state transition time and thus improve the measurement performance. The configuration can be related to measurements on the new serving cell, i.e. after handover or carrier change or primary cell change, and/or for measurements on cells neighbor to the new serving cell. The current serving cell which sends handover command to the measuring node, e.g. the UE, receives the new pattern configuration from the target node, e.g. target eNodeB, over a suitable interface e.g. between the current and target nodes, such as X2 or over a radio interface.

In another embodiment, to reduce the signaling overhead, the network may also signal an indication for the need of a specific dynamic configuration/reconfiguration, and the corresponding pattern may be configured/activated/released by the UE.

In another embodiment, the UE may determine the need for a pattern and send a request to the network. The network receiving the request may provide a measurement or transmit pattern to the UE or configure a transmit pattern at a radio network node.

There may also be an implicit request e.g. a request for measurement gaps, e.g., sent by the measuring node to eNodeB, e.g., for positioning measurements, may comprise an implicit request for a pattern, e.g., an inter-frequency measurement pattern.

In one embodiment, conventional signaling means may be used for measurement reporting under dynamic pattern configuration.

In another embodiment, at least one of the following enhancements may be applied to measurement reporting:
  An indication of a dynamic pattern configuration type or the steady state for which the reported measurement applies is provided together with a measurement report
  An indication of a dynamic pattern configuration type is provided as a failure reason or an error cause
  In some cases the measuring node may require fewer resources for measurement compared to those available in the pattern. In this case the measuring node may indicate the effective measurement pattern, i.e. actually used pattern for measurement or the ratio of the used over the indicated resources for the measurement, to the serving node or to any other suitable node, e.g. an MDT node. The UE may also indicate additional conditions, e.g. speed, overall interference etc., under which the effective measurement pattern is used. For example a UE may use only 1 subframe per every 2-frames for certain measurement although the configured pattern comprises of 2 subframes per frame. This information can be used by the receiving node for network planning, configuration and setting of pattern, e.g., the eNodeB transmit pattern to make the use of network resources more efficiently; or a measurement pattern; or a transmit pattern of a UE, etc.

With or without a cell change, the measurement may be intra-frequency, inter-frequency or inter-RAT. For ICIC, the current standard allows for one measurement pattern per frequency, but the patterns for inter-frequency measurements do not have full support, there are no performance requirements, no test specification, no details how they should be configured or relate to intra-frequency, etc. Since the pattern configuration for steady states are not limited to intra-frequency, this part of the invention describes embodiments related to general rules for configuring inter-frequency patterns. The same rules may apply for inter-RAT patterns.

According to one embodiment, for intra-frequency measurement patterns, there may be a requirement that measurement gaps do not overlap with intra-frequency pattern. There may also be a requirement that an intra-frequency measurement pattern, either the pattern for the serving cell measurements or the pattern for neighbor cell measurements, and inter-frequency measurement pattern shall not overlap.

According to another embodiment, the UE may adaptively use the configured measurement pattern for intra-frequency and/or inter-frequency measurements when also configured with measurement gaps. The measurement period may or may not be extended, which may depend on the pattern configuration, e.g. the periodicity of the pattern. The extension of the measurement period may apply for intra-frequency and for inter-frequency measurements, when the measurement periods for the two overlap.

Further, the following embodiments relate to inter-frequency measurement patterns:
  Measurement gaps may be configured in connection to configuring the inter-frequency measurement pattern
  In one example, an implicit measurement gap pattern may be configured by means of an inter-frequency measurement pattern, e.g. the UE may configure measurement gaps in the time periods indicated for inter-frequency measurements
  A pre-defined measurement gap pattern may be configured when an inter-frequency measurement gap is used for a frequency or cells requirement measurement gaps.
  Further, the inter-frequency measurement pattern length and periodicity (L in FIG. 10) may be different, e.g., 40 ms or 80 ms, than that for intra-frequency, and may correspond to a predefined measurement gap pattern periodicity, e.g., 40 ms or 80 ms, which may apply for at least one of FDD and TDD. The current standard specifies TDD pattern periodicity and length of 20, 60 and 70 ms for some UL/DL configurations.
  The subframes indicated by the pattern for measurements requiring gaps may be configured to comply with the existing measurement gap configurations, e.g., may be configured 40 or 80 ms apart.
  A sufficient overlap of the inter-frequency measurement gaps and measurement occasions indicated by inter-frequency measurement pattern need to be ensured to meet the requirements.
  The blanking rate i.e. the ratio of measurement occasions to the pattern length (e.g., N/L) and density (N in FIG. 10) of an inter-frequency pattern may be defined to correspond to the measurement time within a measurement gap.
  The inter-frequency measurement pattern may be aligned together with measurement gaps by a network node.

Figure 10:
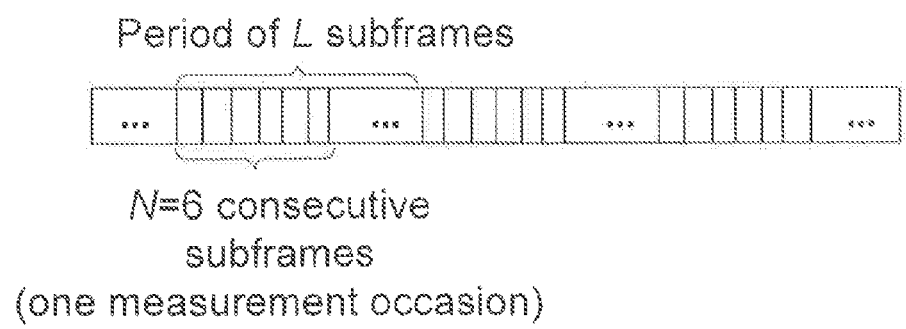
FIG. 10 is a schematic diagram showing an inter-frequency measurement pattern.

FIG. 10 thus illustrates an inter-frequency measurement pattern example, N<=6 subframes, L=40 or 80 subframes, according to an embodiment.

According to one embodiment, the need for the measurement gaps is taken into account also when defining the behavior of the measurement, e.g., RRM, RLM, positioning, CSI, etc., under dynamic configuration of a measurement pattern. For example, when the gaps are needed, the measurement period may be even longer than just due to the state transition. Further, the measurement period may be a function of the number of measured frequencies or carriers, e.g., the measurement period may be proportional to the number of measured frequencies or carriers. In another embodiment, the measurement period may be a function of the number of carriers requiring measurement gaps.

Note that the embodiments described above are not limited to scenarios with state transitions and may apply also for a single steady state, i.e. without dynamic pattern configuration.

Next will be described general rules for embodiments associated with the:
  Measurement behavior of the measuring node (e.g., UE, an eNB, a base station (BS) equipped with a UE-like interface such as a home eNodeB, a relay, a radio measurement unit, LMU, etc., for performing the measurements under dynamic pattern configuration and
  Requirements to be met under dynamic pattern configuration.

The UE or eNB or any other node may perform the measurement and meets the requirements according to the pre-defined rules and report the measurement results to the configuring node or a requesting node etc. This may depend upon the type of measurement. For example:
  UE may report the measurement results to the serving eNB, serving relay or positioning node;
  A relay may report the measurement results to the donor eNB;
  An LMU may report to another LMU, a radio base station, a positioning node or a gateway node communicating with the LMU and the positioning node;
  An eNB may report the measurement results to the neighbor eNB, positioning node, MDT node, SON node, etc.

The requirements may be used to define the measuring UE or measuring node or may also be used by methods of a network node, e.g., to define assistance data, to configure measurement period, to determine the time for state transition or to configure/reconfigure the other-event that may depend on the dynamic pattern configuration or may determine the dynamic pattern configuration, etc.

The general pre-defined rules described here are further elaborated for different measurement categories, e.g. RRM, positioning, CSI etc., below.

The measurement behaviors of the measuring node, e.g. UE, base station, relay, measurement unit, etc., described in more detail in the following subsection, apply at least for these example measurements referred to as "the measurements". The measuring node and measurement node are used interchangeably. The embodiments cover intra-frequency, inter-frequency, and inter-RAT measurements. The measurements may be DL, UL or involve measuring both DL and UL.

As a general rule when applying dynamic pattern configuration, i.e. state transition between any of the steady states, the measurement node adapts the on-going measurement depending upon at least one of the following:
  The state transition e.g. whether pattern is configured or released;
  The steady state before and/or after transition, i.e., the initial and new configurations;
  Measurement requirements e.g., measurement period.

For example the measurement node may adapt the on-going measurement provided that the measurement period is longer than a threshold. This is particularly useful for measurements done in DRX involving longer periods.

The patterns may be used both for UL and DL. Certain measurements are done on both DL and UL signals and thus involve both patterns e.g. one way propagation delay, UE Rx–Tx time difference measurements. Even if the measurement is done on DL or UL signals, e.g. RSRP on DL signals/DL pattern, the UL pattern may influence the measurement.

Therefore the pre-defined rule may also ensure that the measurement node adapts the on going measurement while taking into account:
  At least one of the UL pattern and DL pattern which is (re-)configured i.e. state transition for any of the UL or DL pattern or
  Both UL pattern and DL pattern which are configured or reconfigured i.e. state transition for both patterns.

Some examples of the pre-defined rule according to which the measuring node performs the measurement while dynamic pattern configuration is applied are given below:
  The measuring node continues performing the measurement after the state transition i.e. the measurement is done on signals received and/or transmitted during each steady state. In other words the measuring node combines measurement samples obtained in more than one steady state, e.g. in all steady states.
  The measuring node restarts the measurement after the state transition i.e. the new measurement is done only on signals received and/or transmitted during the new steady state after the state transition. The new measurement done after the state transition is then reported to the serving node or to the configuring node. The measurement performed in the initial state may either be dropped or may also used by the measuring node or reported to another node. For example if the measurement quality is believed to be sufficient then the measurement prior to the state transition, i.e., with the initial configuration, is also reported, e.g., the measurement has been performed in the initial state during a sufficiently long time, i.e. the elapsed time period exceeds a threshold.

Another general rule may be that under dynamic pattern configuration the measuring node aborts the on going measurements or certain types of measurements.
  The measuring node may additionally report the failure/abort message to the configuring or serving node.

Another general rule may be that under dynamic pattern configuration the measuring node only aborts the on going measurements or certain types of measurements depending upon the measurement requirements. For example if the measurement period is below a threshold (Ts) then the measurement is aborted otherwise it may use a first or a second rule.
  The measuring node may also additionally report the failure/abort message to the configuring or serving node.

Yet another general rule may be that a network node can abort the measurement under dynamic pattern configuration, where the network node may or may not be the measuring node and it may or may not be the node configuring patterns, e.g.,
  The measuring node is a Location Measurement Unit, LMU, which may or may not be co-located with eNodeB, the node configuring patterns is eNodeB, and the node sending a measurement abort message under dynamic pattern configuration is a positioning node, e.g. E-SMLC.
  The measuring node is UE, the node configuring the pattern, e.g., a transmit pattern or a neighbor cell, is a neighbor eNodeB, the node sending the measurement abort message is the serving cell eNodeB.

The measuring node is a UE, the node configuring pattern is the serving cell eNodeB, e.g., it has to reconfigure the transmit pattern for some reason and the transmit pattern determines when the measurements are to be performed, i.e. impact the measurements pattern, which is also the node sending the measurement abort message.

The above stated pre-defined rules apply, for example, when there is one or even multiple state transitions over a certain period during which the measurement is done.

A particular pre-defined rule to ensure that the desired measurement behavior may also depend upon one or more of the following factors or conditions:

Type of measurement e.g. mobility measurement, radio link monitoring measurement, positioning measurement, etc.
  For example different or same rule may be applicable for different types of measurements. As an example the first rule and the second rule 2 may be used for RLM and for mobility measurements, e.g. RSRP/RSRQ, respectively.
Number and/or type of parallel measurements performed.
  For example a particular rule may be used when UE is performing mobility as well as positioning measurements in parallel.
Whether the state transition is done for measurement pattern used for DL measurements, e.g. RSRP/RSRQ, for UL measurements, e.g. UL signal strength, UL transmit timing estimate etc., for measurements involving both DL and UL measurement components, e.g. round trip time, one way propagation delay.
  For example a particular rule to be used when the measurement is UE Rx–Tx measurement
Whether the measurement is done on the signals from and/or to the serving cell or the neighbor cell.
Whether the measurement is performed under high interference conditions, e.g., the relation of the interference level to a threshold.
Whether the minimum necessary measurement time, e.g., to meet a certain accuracy of the measurement, is below a threshold or exceeds a threshold.
Whether the measurement is performed in measurement gaps and/or the measurement is performed on a carrier frequency different from one of: the primary cell (in one embodiment) and a serving cell (in another embodiment).

The relation between the measurement and the applicable rule for ensuring the desired measurement behavior under dynamic pattern configuration may be determined:
  Based on a pre-defined rule, or
  Configured, e.g., by network node.
    A network node may configure the measuring node as to which rule is to be used for a particular measurement, or
  Autonomously by the measuring node.
    The autonomous determination may be based on certain conditions, e.g. signal level, propagation, relative signal strength, etc., on type of measurements, etc.

As a general rule, for any of the pre-defined rules, the measuring node performing the measurement when a state transition occurs is deemed to meet the requirements, e.g. reporting delay, measurement period, evaluation period, measurement accuracy, etc., depending upon the requirements:
  During the time before the state transition, or
  After the state transition, or
  Both prior to and after the state transition.

Also as a general rule, the requirements may be met while taking into account the requirements corresponding to:
  At least one of the UL pattern and DL pattern which is configured or reconfigured i.e. for which state transition occurs for any of the UL or DL pattern or
  Both UL pattern and DL patterns which are configured or reconfigured i.e. for which state transition occurs for both patterns
  Worst or least stringent, e.g. longest delay, of the UL and/or DL patterns.

Some specific examples of the pre-defined rule according to which the measuring node may be deemed to meet the requirements are given below:
  Requirements corresponding to the steady state after the state transition may be applicable e.g. a specified measurement period corresponds to the steady state after transition, i.e., the new configuration.
  Requirements corresponding to the steady state which leads to worse performance may be applicable such as longest measurement period e.g. a maximum rule:
  Measurement period=max (measurement period in steady state before state transition i.e. with the initial configuration, measurement period in steady state after state transition i.e. with the new configuration).
  Requirements corresponding to the steady state which leads to best performance may be applicable such as shortest measurement period e.g. a minimum rule:
  Measurement period=min (measurement period in steady state before state transition i.e. with the initial configuration, measurement period in steady state after state transition i.e. with the new configuration).
  Requirements which take into account the performance of measurement done in more than two steady states or in all the steady states done due to state transitions e.g. an aggregated or sum rule:
  Measurement period=measurement period in steady state before state transition+measurement period in steady state after state transition The above mentioned pre-defined rules for requirements applicability can be generalized for any number of state transitions while the measurement is on-going. Consider the case of two state transitions and the sum rule applicable for a particular measurement. Then the measurement period may be be expressed as one of:
  Measurement period=measurement period in steady state before 1st state transition+measurement period in steady state after 1st state transition+measurement period in steady state after 2nd state transition
  Measurement period=measurement period in steady state after the last state transition×N+$\Delta$, where N is the number of state transitions due to a cell change, and $\Delta$ is the additional delay due to other factors
  Measurement period=measurement period in one of the steady states (e.g. the longest)×K+$\Delta$, where K is the number of state transitions, and $\Delta$ is the additional delay due to other factors.

Furthermore the additional factors may also be included in the requirements such as delay accounting for the state transitions. More specifically the configuration of the patterns involves some delay. For example when a pattern is configured or reconfigured the extra delay is caused due to any one or more of the following factors but not limited to:
  Time to process the received message in the measuring node
  Time to receive the new configuration message Uncertainty time as to when the new configuration becomes valid e.g. in terms of one or more subframe or frames Measurement occasion loss, e.g., when the time of the dynamic configuration coincides with a measurement occasion of the initial configuration and/or of the new configuration (for example, for one transition, the measurement time delay due to the measurement occasion loss may be defined e.g. as the time to the end of first available measurement occasion with the new configuration—see FIG. 11).

Figure 11:
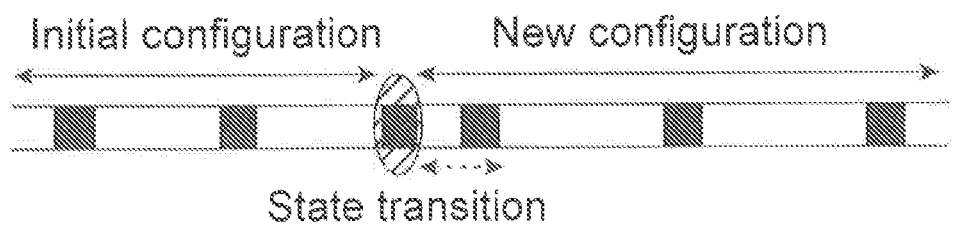
FIG. 11 is a schematic diagram depicting measurement occasion loss.

FIG. 11 illustrates measurement occasion loss due to dynamic pattern configuration. Therein black squares denote measurement occasions indicated by the respective pattern, and the dashed arrow line is the delay time. The measurement occasion loss occurs due to the state transition occurring when the initial configuration indicates the next measurement occasion.

Considering now the behavior of RRM measurements under dynamic configuration of patterns, the RRM measurements discussed in the following embodiments broadly cover UE and/or base station measurements which may be used for any radio resource management operation e.g. mobility decision, link monitoring etc. This also includes measurements related to MDT, SON or for any other radio network operation etc.

In particular the following RRM measurements performed by the UE or by relay are given as examples:
  RLM which is based on out of sync and in sync detection of any serving cell
  Cell identification reporting e.g. E-UTRA cell search, inter-RAT UTRAN cell search, SI acquisition etc
  UE transmit power or UE power headroom, e.g. difference between max output power and transmitted power on log scale
  Signal strength and signal quality in general e.g.
    LTE RSRP and RSRQ
    Path loss or path gain
    Inter-RAT measurements, e.g. inter-RAT UTRAN CPICH measurements, inter-RAT GSM carrier RSSI measurement etc.,
  RRM measurements in general, e.g. any signal quality, signal strength measurement.

The base station or relay or any radio network node may also perform the following RRM measurements:
  received signal strength, received signal quality
  path loss or path gain
  Transmit power in general e.g. total power of all signals
  Transmit power of specific signals, e.g., CRS transmit power, synchronization signal transmit power, etc.

Table 2 summarizes a few examples of the preferred behaviors, rules and requirements applicability, which are further described in more detail.

TABLE 2

Summary of a few examples of the preferred UE behaviors for performing RRM measurements

| Measured cell | Cell where state transition occurs | UE behavior | Measurement period |
|---|---|---|---|
| Serving cell measured | Serving cell, without cell change | Continue measurements with the new configuration | Longest among the periods corresponding to steady states |
| | Serving cell, due to cell change | Restart measurement on the new cell | Based on the new configuration; the measurement period may be a function of e.g., scaled with, the number of cell changes |
| | Neighbor cell | Continue measurements with the new configuration | Longest among the periods corresponding to steady states |
| Intra-frequency neighbor cell measured | Neighbor cell | Continue measurement with the new configuration | Longest among the periods corresponding to steady states |
| | Neighbor cell, due to a cell change | Continue measurement with the new configuration | Longest among the periods corresponding to steady states |
| Inter-frequency neighbor cell measured | Serving cell | Continue measurement with the new configuration | Longest among the periods corresponding to steady states |
| | Serving cell, due to cell change | Continue measurement with the new configuration, if the inter-frequency is not the new serving cell; otherwise restart | Longest among the periods corresponding to steady states when not restarted; otherwise, based on the new configuration (the measurement period may also be a function of, e.g., scaled with, the number of cell changes) |
| | Neighbor cell | Continue measurement with the new configuration | Longest among the periods corresponding to steady states |

Intra-frequency measurements may be categorized into serving cell (can be multiple serving cells as with CA) measurements and neighbor cell measurements. In each case, the state transition may occur without cell change or due to a cell change. Further, the state transition in an own cell, i.e. serving cell, or a neighbor cell may have an impact on measurements and behaviors. Next some example embodiments are described; however, any general rule as described above may also be applied herein.

Considering now serving cell measurements, and starting with state transition for the serving cell without a cell change, when a state transition occurs for the measured serving cell, the UE shall continue the measurements on this cell.

The measurement period may be extended due to a state transition. In one example, the measurement period is defined as the longest among those corresponding to the initial configuration (T1) and new configuration (T2). The measurement period may be defined based at least on signal level/quality and pattern characteristic, e.g., number of indicated subframes. For example, with one state transition during the measurement, the required measurement period may be defined as:

$$T = \max(T1, T2) + t,$$

where T1 and T2 are the required measurement periods corresponding to the initial and new configurations, respectively, and t (t>=0) is the time spent in the transition state.

In another example, the total measurement period may be defined as a linear combination with weights corresponding to the time spent in each of the steady states. For example, with one state transition during the measurement:

$$T=a1*T1+a2*T2+t,$$

where a1 is the time spent with the initial configuration, and a2 is the time spent with the new configuration, and t (t>=0) is the time spent in the transition state.

Considering next state transitions for the serving cell due to a cell change, the UE may restart the measurement on:
  the new serving cell, when the UE is not configured with carrier aggregation and a state change occurs due to a cell change;
  the new primary cell, when the UE is configured with carrier aggregation and a state change occurs due to a primary cell change;
  the new primary cell, when the UE is configured with carrier aggregation and a state change occurs due to a primary carrier change.

The measurement period for the restarted measurement may be defined with respect to the new configuration. The measurement for the initial configuration may also be reported, e.g., if the measurement is of a sufficient quality or the initial-configuration measurement period has been long enough.

Considering next, state transition for a neighbor cell, when a state transition occurs for a neighbor cell, the UE shall continue the measurements on the serving cell. The measurement period may be extended with a state transition for an inter-frequency neighbor cell, e.g., when the transition state is of type 1 (see FIG. 9). When a state transition occurs for an intra-frequency neighbor cell, the measurement period may be not impacted.

Considering next intra-frequency neighbor cell measurements, and starting with state transition for the measured neighbour cell without a cell change, when a state transition occurs for the measured cell, the UE shall continue the measurements on this cell. The measurement period may be extended due to a state transition. In one example, the measurement period is defined as the longest among those corresponding to the initial configuration (T1) and new configuration (T2). The measurement period may be defined based at least on signal level/quality and pattern characteristics, e.g. number of indicated subframes. For example, with one state transition during the measurement:

$$T=\max(T1,T2)+t,$$

where T1 and T2 are the measurement periods corresponding to the initial and new configurations, respectively, and t (t>=0) is the time spent in the transition state.

In another example, the total measurement period may be defined as a linear combination with weights corresponding to the time spent in each of the steady states. For example, with one state transition during the measurement:

$$T=a1*T1+a2*T2+t,$$

where a1 is the time spent with the initial configuration, and a2 is the time spent with the new configuration, and t (t>=0) is the time spent in the transition state.

Considering next state transition for the measured neighbour cell due to a cell change, a serving or primary cell change (e.g., from macro cell to pico cell) may also cause a state transition for a neighbor cell. In this case, the UE shall continue the neighbor cell measurement. The measurement period may be extended due to a state transition. In one example, the measurement period is defined as the longest among those corresponding to the initial configuration (T1) and new configuration (T2). The measurement period may be defined based at least on signal level/quality and pattern characteristic, e.g., number of indicated subframes.

Considering now inter-frequency RRM measurements, in 3GPP, inter-frequency measurements, according to the applicability of inter-frequency requirements [3GPP TS 36.133], are typically the measurements performed on a frequency different from a serving cell (PCell or SCell) frequency. In CA systems, inter-frequency requirements may also apply for measurements on SCell when the SCells are not configured for CA. Inter-frequency measurements are thus always on a non-serving (neighbor) cell and measurements on a cell configured for CA frequencies are inter-frequency measurements, according to this definition of inter-frequency. However, the embodiments are not limited to this 3GPP RAN4 definition of inter-frequency, and inter-frequency may also be understood in a broader sense, e.g., any measurement on a frequency different from the serving cell frequency (in non-CA systems) or from the primary cell (in CA systems) may be considered as inter-frequency measurement. This also applies to the other discussions herein regarding inter-frequency measurements.

Similarly to the case of intra-frequency measurments, the state transition may occur without or due to a cell change. Further, the state transition in own cell, i.e. a serving cell, or a neighbor cell may have an impact on measurements and behaviors. Next some example embodiments are described; however, any general rule as described above may also be applied herein.

When measurement gaps are not used, e.g., when measuring on a configured SCell, the same rules as for intra-frequency may apply e.g. for the measurement time period. The measurement accuracy may or may not be the same for intra- and inter-frequency.

When measurements gaps are needed, the rules may be similar but the measurement period for at least one steady state may be longer and thus the total measurement period may be longer. The measurement time period and other measurement requirements may also depend e.g. on
  whether the inter-frequency measurements are inter-band or intra-band,
  whether CA is configured for the concerned carrier frequencies,
  which carrier type is configured,
  whether measurement gaps are configured in general in parallel with the on-going measurement or specifically for performing the concerned measurement, e.g., in LTE measurement gaps are generally not needed for SCell measurements, whilst in HSPA this depends on UE capability,
  number of inter-frequencies,
  whether the receiver (for UL) or transmitter (for DL) are co-located with the a serving cell or primary cell,
  whether the other nodes/transmitters/receivers involved in the measurement, except for the measuring node, e.g., UE for UR Rx–Tx measurements, are co-located with each other, e.g., the radio node is involved in UE Rx–Tx measurements by receiving the UE UL signal and transmitting a DL signal, if the DL transmitter is co-located with UL receiver the measurements may be more accurate or require a shorter measurement period.

With a cell change, the UE may or may not restart the measurements, which may also depend on one of the conditions above.

Considering now the behavior of measurements under cell change to unknown cell, it will be appreciated that interruption on the physical layer transmission and reception occurs during the cell change. When the target cell is unknown the UE has to detect the cell prior to performing cell change. In this case the pattern for measuring on the target cell may be different compared to that used in the currently serving cell. Some examples of cell change scenarios in which the UE measures the unknown target cell prior to accessing the cell are given below:

Handover

RRC connection re-establishment to a target cell

RRC connection release with redirection to a new target cell

Cell reselection, etc.

In the current specification for handover, the interruption time is the time between end of the last Transmission Time Interval (TTI) containing the RRC command on the old Physical Downlink Shared Channel (PDSCH) and the time the UE starts transmission of the new Physical Random Access Channel (PRACH), excluding the RRC procedure delay. This requirement applies when UE is not required to perform any synchronisation procedure before transmitting on the new PRACH.

$T\text{interrupt} = T\text{search} + \text{TIU} + 20 \text{ ms},$ where:

Tsearch is the time required to search the target cell when the target cell is not already known when the handover command is received by the UE. If the target cell is known, then Tsearch=0 ms. If the target cell is unknown and signal quality is sufficient for successful cell detection on the first attempt, then Tsearch=80 ms. Regardless of whether Discontinuous Reception (DRX) is in use by the UE, Tsearch shall still be based on non-DRX target cell search times. TIU is the interruption uncertainty in acquiring the first available PRACH occasion in the new cell. TIU can be up to 30 ms.

There may be DL and/or UL patterns defined for measurements. State transition in DL and/or UL may occur with handover. Tsearch shall thus be changed to T where T is defined above. To account for a state transition in UL, either an additional delay may be added or TIU may be increased.

Similarly for other types of cell change scenarios (e.g. listed above) the time to detect the target cell has to be modified according to the rules defined above.

Considering now the behavior of timing measurements under dynamic configuration of patterns, one example of a timing measurement is UE Rx–Tx Time Difference. Currently UE Rx–Tx measurements are only defined for the serving cell or the primary cell when the UE is configured for CA. The behaviors are thus similar to those for serving sell measurements, e.g., unless the cell is changed the UE shall continue the measurement and the total measurement period may be extended to the longest one. Similar rules may also apply if the UE Rx–Tx measurement is defined also for secondary cells in the future.

Other timing measurement examples are described above. The behaviors and requirements would typically be defined depending on which cell the measurement is performed. The corresponding general rules or rules similar to those for RRM measurements for serving or neighbor cells, intra-frequency or inter-frequency/inter-RAT, may then apply.

Considering next the behavior of positioning measurements under dynamic configuration of patterns, and starting with OTDOA, the general measurement rule described earlier applies to OTDOA measurements e.g. RSTD. In particular the UE shall continue intra- or inter-frequency RSTD measurements when a state transition occurs. This is because the UE already has assistance data which contains the information about the cells to measure.

In another example the UE may postpone the use of the newly configured pattern for the measurements until the completion of the on going RSTD measurements.

The measurement requirement such as RSTD measurement period may be extended to the longest one among the steady states.

The RSTD measurement period may be extended to account for the loss of one or more Positioning Reference Signal (PRS) occasion which cannot be used for measurements. This may occur if the dynamic pattern configuration procedure coincides with the PRS occasion. This may even occur if the pattern configuration is done for some other measurements, e.g. for RSRP/RSRQ. This is because the UE may not be able to process the PRS for position in parallel with the dynamic pattern configuration.

Considering next the behavior of positioning measurements under dynamic configuration of patterns in the context of E-CID, the general measurement rule described earlier applies to E-CID measurements e.g. UE Rx–Tx Time Difference measurement, eNB Rx–Tx Time Difference measurement, Angle of arrival (AoA) measurement, timing advance measurement, RSRP/RSRQ etc. AoA may be performed for the serving cell or neighbor cell, and may be measured by UE or radio node. So, depending on the cell and the measuring node, the corresponding rules may apply.

For UTDOA, the radio node (e.g. LMU) may continue when a state transition occurs. The measurements are based on UE transmissions. In another embodiment, the radio node may restart when a state transition occurs (e.g., a cell change, even though the measurement pattern may be the same). The restart may be upon a state transition notification/indication from another node, e.g., associated eNodeB or positioning node. The measurement restart for UTDOA may be particularly justified when the state transition cause changes in the measured signal characteristics, e.g., as it occurs when the serving cell changes with Sounding Reference Signals (SRS), whose sequence may be cell-specific.

The measurement period may be extended to the longest one among the steady states. It may also be a function of the number of measurement restarts. Depending on the cell and the measuring node, the corresponding rules described above may apply.

The resource assignment measurements enable the network node to allocate appropriate resources for data transmission and/or reception. An example is the channel state information (CSI) measurements. The CSI includes Channel Quality Indicator (CQI), PMI and Rank Indicator (RI).

The general measurement rules described earlier apply to CSI measurements.

As CSI measurements are performed on a serving cell, the rules similar to those for the serving cell RRM measurements may also apply here.

Considering next methods in a network node for configuring pattern while considering measurement behavior, there may be various conditions for actions taken by the network. For example, the network node, e.g. serving eNB, relay, positioning node etc., may take certain actions or perform certain tasks while taking into account at least one of the following:

Impact of dynamic pattern configuration on the measurement behavior

Impact of the corresponding requirements under dynamic pattern configuration

The type of pattern configured or typically configured

Impact of patterns configured specifically for inter-frequency or inter-RAT measurements The actions or tasks may also depend upon the type of measurement, measured cell, number of measurements on going in parallel, carrier type, etc.

In terms of examples of actions taken by the network, a network node determines the suitable state transition time and configures the patterns accordingly, e.g., to minimize the measurement interruption probability or the total measurement period.

The radio network node, e.g. eNodeB, radio measurement unit, relay, etc. may configure the inter-frequency measurement patterns when it configures the measurement gaps.

The radio network node, e.g. eNodeB, relay etc. may configure or reconfigure the measurement pattern but allows the UE that it can use the pattern for measurements after the current measurements are completed.

The radio network node, e.g. eNodeB, relay etc. may avoid doing handover to a cell until the on going measurements are completed in case the performance becomes worse after handover.

The radio network node may postpone configuring DRX, e.g., until the on-going measurement is finished, when configuring DRX may cause a state transition and thus may potentially may impact the measurement.

The radio network node may avoid reconfiguring a pattern with low transmission or measurement activity until the on-going measurements are completed in case the performance becomes worse after the configuration.

The positioning node, e.g. E-SMLC, may indicate to the eNB not to change the pattern until the existing measurements are completed e.g. if there are on going measurements for a critical service like an emergency call.

The positioning node may postpone the start of the positioning session if the pattern configuration or reconfiguration is on-going or will be done within shortly.

The positioning node may postpone requesting or indicating the need for state transition for a measuring node, e.g., UE, eNodeB, LMU, etc., until at least one positioning session, e.g., for a specific UE or of a specific type or associated with a specific requested QoS, is over, i.e. finalized, or a measurement report is received.

The positioning node may request or indicate the need for the state transition, e.g., reconfiguring specific signals transmitted by a radio node or a UE, after determining the time elapsed from the beginning of the session and/or determining the maximum measurement time, e.g., indicated by positioning QoS.

In terms of the applicability of the afore-described embodiments to test cases and test equipment, the methods and rules described herein, e.g., the method of measurement configuration in UE or any wireless device, e.g. mobile relay, radio measurement unit, etc., or measurement patterns which may also be communicate to a measuring node if configured by another node, can also be configured in the test equipment (TE) node, also known as system simulator (SS). The TE or SS will have to implement configuration methods related to measurement pattern configuration in order to be able to configure the UE for the test. The purpose of the test is to verify that the UE is compliant to the pre-defined rules, protocols, signaling and requirements associated with measurement patterns. Such tests may be conducted for intra-frequency, inter-frequency and inter-RAT measurements under dynamic pattern configuration. At least some embodiments may also be used for testing inter-frequency or inter-RAT measurements with patterns which are not necessarily dynamically configured.

The TE or SS will also be capable of:

Receiving the UE measurement results associated with the state transition

Analyzing the received results e.g. comparing the with the reference results. The reference can be based on the pre-defined rules, requirements or UE behavior.

Among other advantages, embodiments enable for example:

The measurements, measurement behaviors and requirements are defined under the scenario where measurement patterns can be configured, modified or released The measurements are not interrupted if the patterns are changed, which implies more efficient resource utilization at the measuring node and the network The UE and network node, e.g. eNB, radio measurement unit, relay, etc., measurement behaviors under dynamic pattern configuration or re-configuration are well defined.

The UE and network node, e.g. eNB, relay etc., measurement requirements are met under dynamic pattern configuration or re-configuration and are defined ensuring good performance in the field.

Methods related to actions taken by the network under dynamic pattern configuration or re-configuration that ensures good measurement performance are provided.

Figure 12:
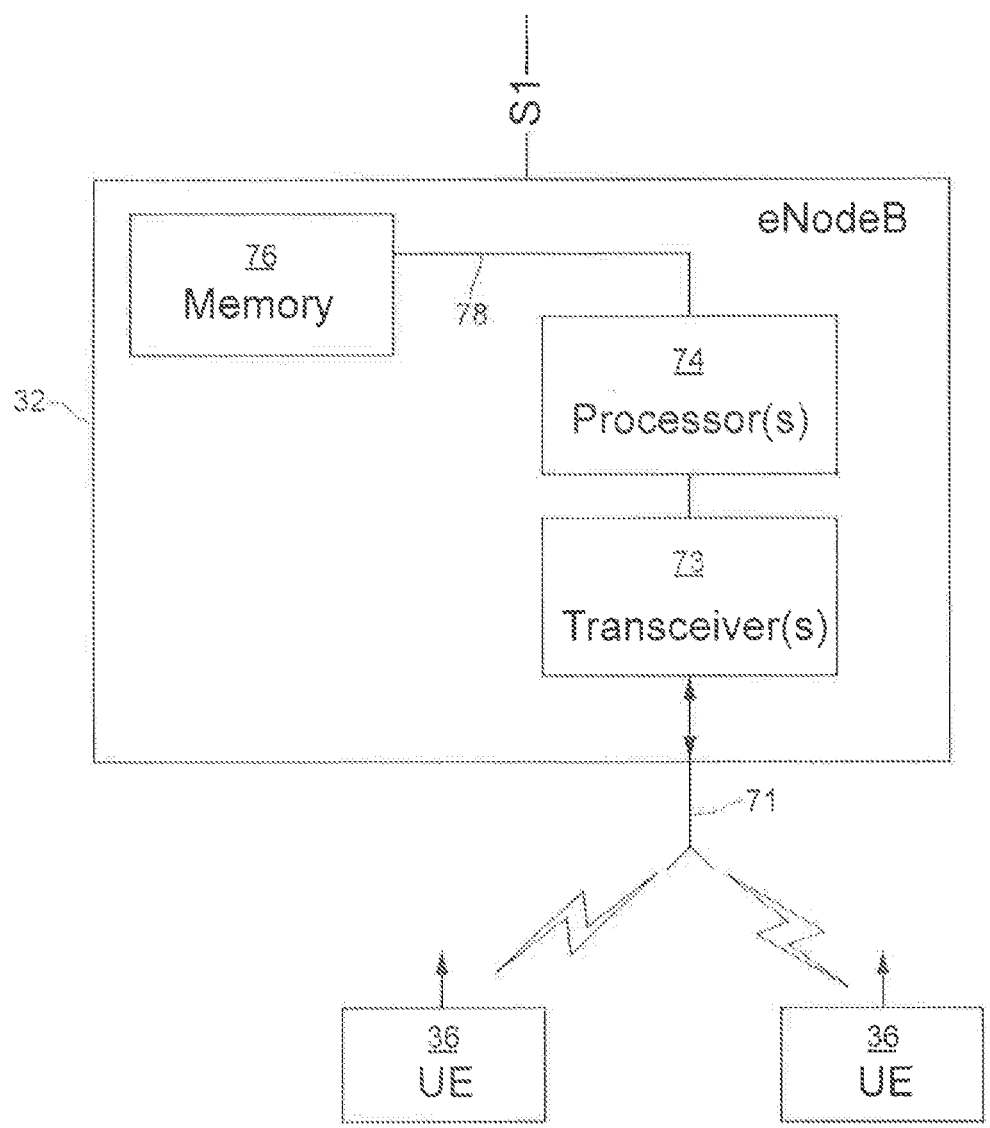
FIG. 12 is a schematic block diagram illustrating elements of a base station (or other node).

Measurements and pattern configurations are defined for inter-frequency measurements An example base station 32, e.g., an eNodeB, which is configured to interact with a UE as described above is generically illustrated in FIG. 12. Therein, the eNodeB 32 includes one or more antennas 71 connected to processor(s) 74 via transceiver(s) 73. The processor 74 is configured to analyze and process signals received over an air interface via the antennas 71, as well as those signals received from core network node, e.g., access gateway, via, e.g., an interface. The processor(s) 74 may also be connected to one or more memory device(s) 76 via a bus 78. Further units or functions, not shown, for performing various operations as encoding, decoding, modulation, demodulation, encryption, scrambling, precoding, etc. may optionally be implemented not only as electrical components but also in software or a combination of these two possibilities as would be appreciated by those skilled in the art to enable the transceiver(s) 72 and processor(s) 74 to process uplink and downlink signals. A similar, generic structure, e.g., including a memory device, processor(s) and a transceiver, can be used, among other things, to implement communication nodes such as UEs 36 to receive signals and process those signals in the manner described above. Likewise the elements shown in block 32 could also represent a network node, albeit without the provision of an air interface transceiver.

The inventors have realized that, with the introduction of dynamic measurement configuration in wireless communication systems, where a measuring node may be instructed to change measurement configuration from a first to a second measurement configuration, and wherein at least one of the first and second measurement configurations define a signal activity pattern, it has become unclear for the measuring node how to handle the measurements, when it is instructed to change measurement configuration. As a result, the measuring node may discard the measurements performed according to the first measurement configuration. This means that relevant measurements may be lost or significantly degraded. In this way, relevant measurements that may have been useable for improving network performance may be lost. Also, the measurement configuration can be changed any time, e.g. the reconfiguration may happen at the end of the measurement period. This means the entire measurement process may be restarted from the beginning. This in turn may almost double the measurement period of the on-going measurement. Also, if measurements that have been performed are discarded, it may mean that UE resources and/or network resources that have been used for performing the measurements have been used in vain. Therefore, it would be an improvement to be able to use the already performed measurements from the viewpoint of usage of UE and network resources. Therefore, to e.g. improve usage of network resources, embodiments of this invention deal with using both the measurements performed according to the first measurement configuration and the measurements according to the second measurement configuration for radio resource management tasks.

Figure 13:
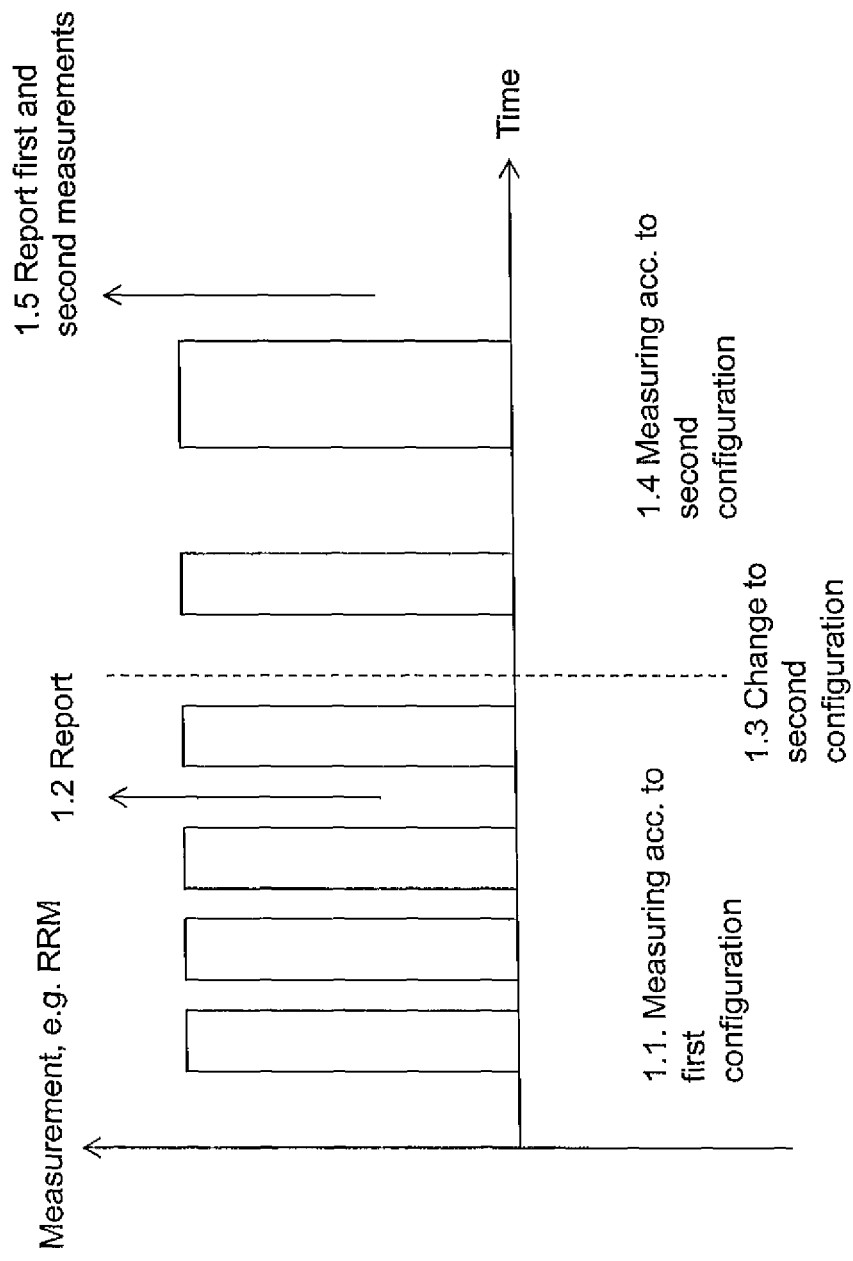
FIG. 13 is a graph illustrating measurements performed over time for a measuring node.

FIG. 13 is a graph describing an example of measurements performed over time at a measuring node according to an embodiment. The measurements may be RRM measurements. Different measurement configurations are illustrated in the graph by differently placed bars in the diagram. First, the measuring node 1.1 measures on received signals according to a first measurement configuration. The measuring node may then send 1.2 a report to a network node, the report comprising measurements performed so far according to the first measurement configuration. The first measurement configuration may be a signal activity pattern, such as a measurement pattern. Thereafter, the measuring node may receive an instruction to change 1.3 measurement configuration to a second measurement configuration, which may comprise a different signal activity pattern, such as a different measurement pattern. The measuring node thereafter continues by measuring 1.4 according to the second measurement configuration. Thereafter, the measurements performed according to the first and the second measurement configurations are used for radio resource management tasks. In this example, the first and the second measurements are used by being reported 1.5 to a network node that performs radio resource management tasks based on the reported measurements. In an alternative, the instruction to change 1.3 to a second measurement configuration may be received before a first report 1.2 has been sent. In this case, the first step of reporting 1.2 only first measurements is omitted.

Figure 14:
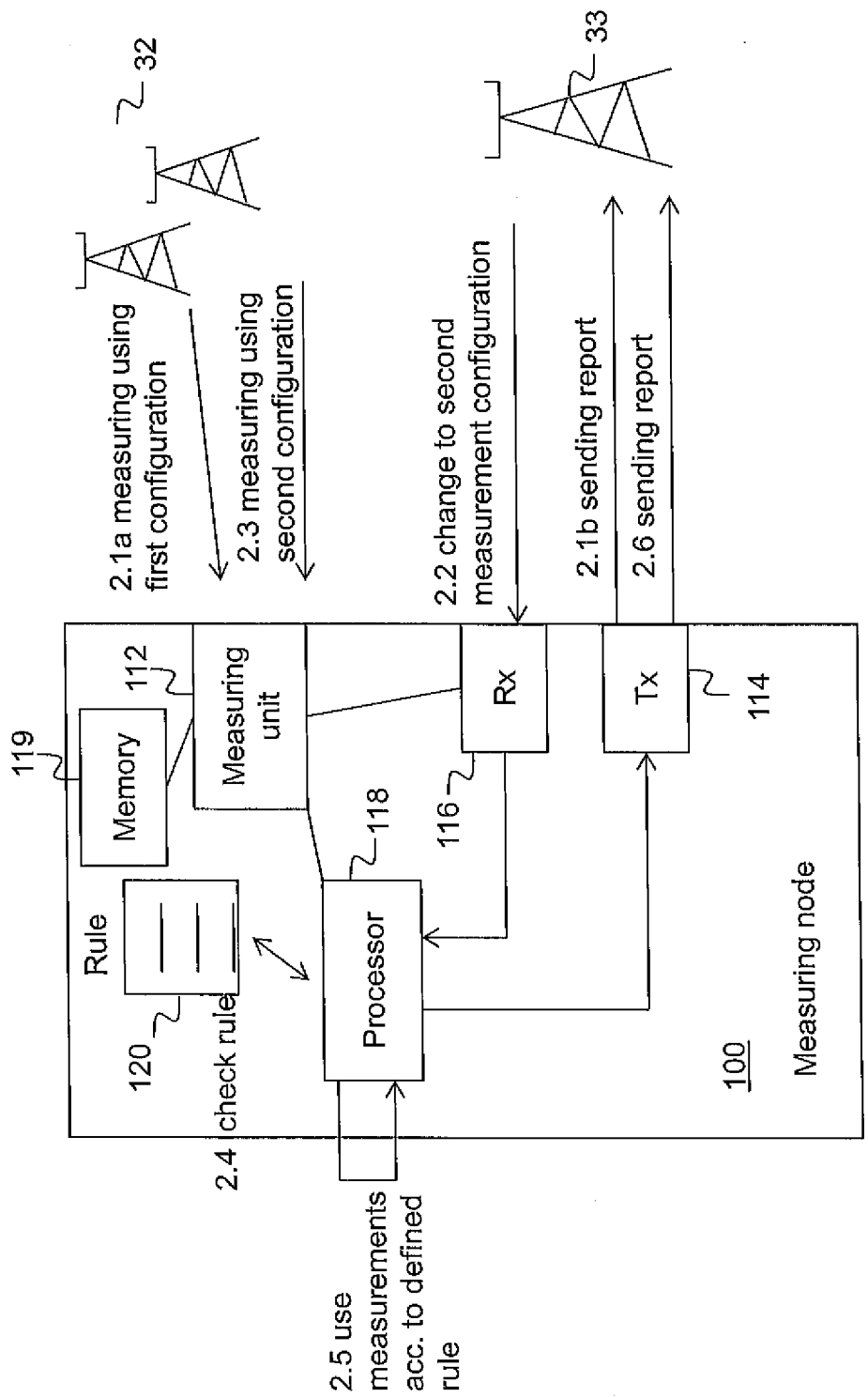
FIG. 14 is a communication scenario illustrating communication between base stations and a measuring node according to possible embodiments of the invention.

FIG. 14 shows a schematic block diagram of a wireless communication system according to an embodiment of the invention comprising a measuring node 100 and network nodes in the shape of first base stations 32, and a second base station 33. FIG. 14 further shows a communication scenario according to an embodiment of the invention. The communication scenario starts by the first base stations 32 sending signals to the measuring node 100, which may be a UE. The signals may be received at a receiver 116 of the measuring node. Further, a measuring unit 112 in the measuring node measures 2.1a on the received signals using a first measurement configuration. The measuring unit 112 may be connected to the receiver 116. The first measurement configuration may have been received beforehand from a network node, such as the second base station 33. The measuring node 100 may then send a report 2.1b to the second base station 33 comprising results of the measurements performed by the measuring unit 112 according to the first measurement configuration. The report 2.1b may be sent via a transmitter 114 of the measuring node 100. The measuring node 100 then continues performing measurements according to the first measurement configuration until the measuring node 100 receives an instruction, e.g. from the second base station 33, to change 2.2 to a second measurement configuration. The instruction is received at the receiver 116 of the measuring node 100. The measuring unit 112 is then set to perform measurements according to the second measurement configuration, preferably by a processor 118 of the measuring node. The processor 118 may be a processor of the measuring node. Also, in the measuring node 100 there may be a memory 119 in which for example performed measurements are stored. The memory 119 may be connected to the processor 118 and/or the measuring unit 112.

Hereinafter, the measurements performed according to the first measurement configuration are called the first measurements, and the measurements performed according to the second measurement configuration are called the second measurements. When the measuring node continues receiving signals after the measuring unit 112 has been set to the second measurement configuration, the measuring unit 112 performs 2.3 second measurements. At least one of the first measurements and the second measurements are performed according to a signal activity pattern, such as a transmit pattern or a measurement pattern. The measuring unit 112 now has stored or in some other way keeps both first and second measurements. The first and the second measurements are taken care of by the processor 118 in such a way that the first and the second measurements are used for radio resource management tasks. The processor 118 checks 2.4 a rule 120 to find out how to use the first and the second measurements. The rule may define how to use the measurements depending on how many first measurements and second measurements there are, what kind of measurements that have been performed, if a value of a measurement characteristic is above a threshold level or not, etc. The rule may be adapted to any use case such that the first and the second measurements are used in the best possible way for radio resource management tasks for each use case. Thereafter, the first measurements and the second measurements are used 2.5 according to the defined rule. Possibly, the used measurements may be reported 2.6 to the second base station 33, which in turn may use the measurements to improve the usage of radio resources, for example.

The communication scenario may be exemplified for a case where RRM measurements are performed. Let us say that the measuring node 100 is a UE and the UE performs measurements on a serving cell, i.e. measurements on signals received from the base station 32 of the serving cell according to a first measurement pattern. The UE detects that it should change measurement pattern into a second measurement pattern. In this exemplary case, the second measurement pattern may have been received from a network node, but there has not been any cell change for the UE in connection with the change of measurement pattern, i.e. the UE still is connected to the same base station of the serving cell. Then the measurement-related rule may identify, based e.g. on pattern properties and/or information that the second measurement pattern has not been received due to a cell change, that the UE should continue measuring on the serving cell but start using the second measurement pattern. The measurement-related rule may identify that the first measurements are to be combined with the second measurements. Further, the combined measurements may be reported to a network node for further treatment.

On the other hand, in the example above, if the UE gets instructions to change measurement pattern and there is a change to a new serving cell in connection with the change of measurement pattern, the measurement-related rule may identify that the measurements are to be restarted with the second measurement pattern. I.e. the remaining first measurements are to be dropped and only the second measurements are to be used. Consequently, in the two different alternatives described, the measurements are used differently based on the different prerequisites and reasons for the change of measurement configuration, which in this case was whether or not there was a cell change that triggered the change of measurement configuration.

In FIG. 14 there is a separate second base station 33 that receives reports and sends instructions to change measurement configuration. This second base station 33 may be the same base station as any of the base stations 32 that sends the signals but it may also be a separate network node, for example a separate base station but also, and more probably, a network node higher up in the network, such as an O&M node or any type of control node.

Figure 15:
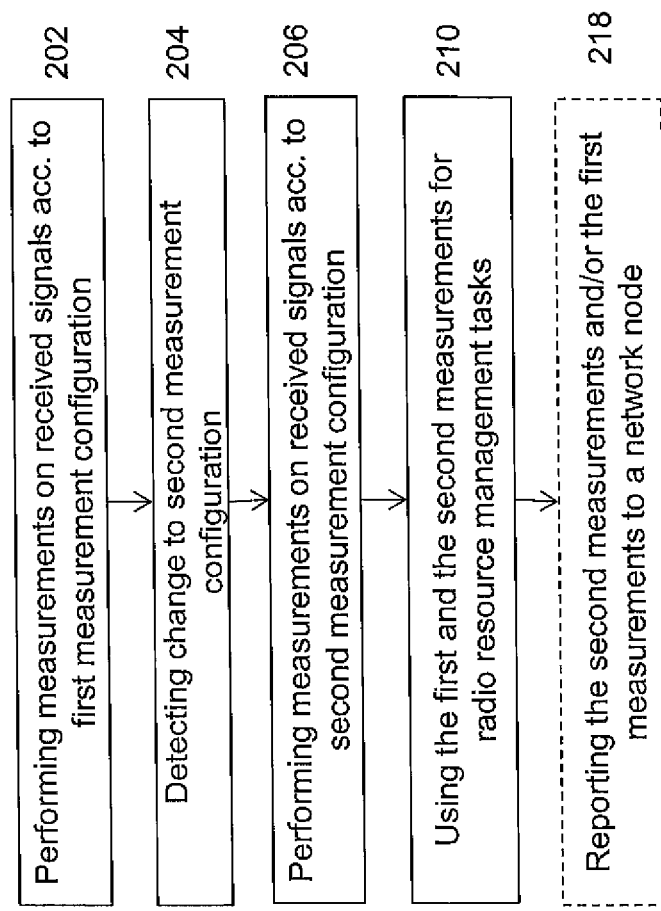
FIG. 15 is a flow chart illustrating a procedure in a measuring node, according to a possible embodiment.

According to an embodiment as described in FIG. 15, a method in a measuring node is provided for handling measurements performed on signals received over a wireless interface in a wireless communication system. The method comprises performing 202 measurements on the received signals according to a first measurement configuration, detecting 204 that a change from the first measurement configuration to a second measurement configuration has occurred, and performing 206 measurements on the received signals according to the second measurement configuration. At least one of the first measurement configuration and the second measurement configuration comprises a signal activity pattern. The method further comprises using 210 the first measurements and the second measurements for radio resource management tasks.

The method may also comprise the step of reporting 218 the first measurements and/or the second measurements to a network node, such as an O&M node or any type of control node.

According to an embodiment, the measurements performed may be at least one of the following measurement types: timing measurements, positioning measurements, RRM measurements, Radio Link monitoring (RLM) measurements, cell identification measurements, received signal strength and signal quality measurements, transmit power or power headroom measurements, pathloss measurements.

According to another embodiment, the radio resource management tasks may be at least one of the following tasks: radio bearer control, radio admission control, connection mobility control or cell change, dynamic resource allocation and packet scheduling, inter-cell interference coordination (ICIC), Self-Optimized Networks (SON) functions related to radio resources, and load balancing. The tasks connection mobility control or cell change may be at least one of the following tasks: handover, RRC connection re-establishment to a target cell, RRC connection release with redirection to a new target cell, cell reselection, PCell or primary carrier change in a multi-carrier system.

According to an embodiment, when the measuring node is a user equipment, UE, the change from the first measurement configuration to the second measurement configuration may occur due to any of the following reasons: triggered by an event such as a cell change, changed interference conditions, changed signal level, reception of a new measurement configuration from a network node such as a base station, an O&M node, etc.

Figure 16:
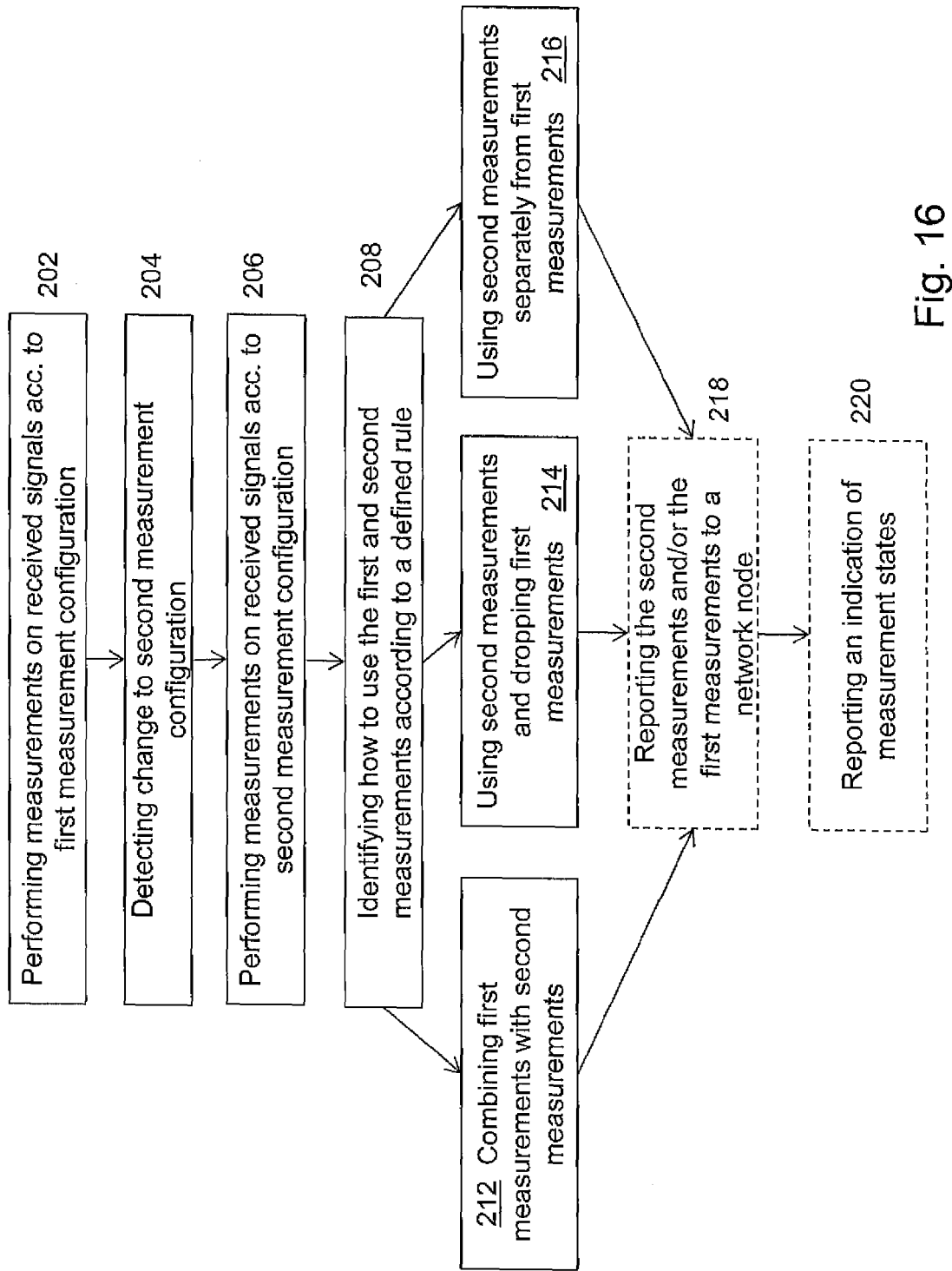
FIG. 16 is a flow chart illustrating another procedure in a measuring node, according to other possible embodiments.

FIG. 16 describes another embodiment of a method for handling measurements performed on signals received over a wireless interface. The method comprises performing 202 measurements on the received signals according to a first measurement configuration, detecting 204 that a change from the first measurement configuration to a second measurement configuration has occurred, and performing 206 measurements on the received signals according to the second measurement configuration. At least one of the first measurement configuration and the second measurement configuration comprises a signal activity pattern. The method further comprises identifying 208 how to use the first measurements and the second measurements according to a defined measurement-related rule pertaining to handling of the measurements. The measurement-related rule may pertain to handling of the first measurements and the second measurements.

The measurements performed before and after a state transition should preferably be relevant and comparable to be combined. If not, there is a risk that radio resource utilization may rather decrease than increase. By defining a rule that identifies how to use measurements performed before and after a change of measurement configuration it may be accomplished that the measurements are used in a favorable way for the communication system.

By identifying how to use measurements performed before and after a change from a first to a second measurement configuration according to a defined rule, it is possible to use the first and second measurements in a way that has proven to be a good way for taking advantage of both the first and the second measurements depending on different conditions. For example, if the measurements relate to RRM measurements on a serving cell and there has been no cell change, the rule may identify that the first and the second RRM measurements are to be combined. On the other hand, if the measurements relate to RRM measurements on a serving cell and the serving cell has changed, the rule may identify that the first measurements are to be dropped and the second measurements are to be used.

According to another embodiment, the signal activity patterns is any one of a transmit pattern and a measurement pattern. Further, the transmit pattern may be an Almost Blank Subframe pattern or a time-domain measurement resource restriction pattern.

According to yet another embodiment, the rule identifies 208 how to use measurements performed according to the first measurement configuration and the second measurement configuration based on at least one of the following measurement data: measurement type, a value of a measurement characteristic, whether the measurements performed are downlink or uplink measurements and reason for the change of measurement configuration. For example the measurement configuration may change if the transmit pattern, e.g. an ABS pattern, is changed in an aggressor cell. A measurement pattern may be part of the measurement configuration and comprises restricted subframes, which in turn should overlap with the ABS pattern in the aggressor cell. In another example if the UE reported measurement results are worse than expected, e.g. RSRQ is below a threshold such as below −15 dB, then the network may change the measurement configuration. For example in this case the network may configure a denser measurement pattern, i.e. one with more restricted subframes per frame. Another example is a state change of a serving cell(s) or mobility. Yet another example is dynamic inter-cell interference coordination. Yet another example is a change of an UL pattern when DL measurements are performed or a DL pattern when UL measurements are performed.

According to yet another embodiment, the rule identifies 208 how to use the measurements performed according to the first and the second measurement configuration based on a first steady state before changing from the first measurement configuration to the second measurement configuration and a second steady state after changing from the first measurement configuration to the second measurement configuration. By "a steady state" is meant a steady measuring state before and after a state transition, such as steady states "measuring without a pattern" or "measuring with a pattern".

According to still another embodiment, the method comprises reporting 220 an indication of the first steady state and the second steady state, for example to a network node, such as an O&M node, or the second base station 33.

According to another embodiment, the first measurements are used if a value of a measurement characteristic is above a threshold. The measurement characteristic may be a measurement time period, or a signal strength or an error rate for the received signal. By "a measurement time period" is meant measurement time period of first measurements, which measurements have not been used previously by the system, for example first measurements that have not yet been reported. "An error rate for the received signal" may be for example a bit error rate or a block error rate.

The method may also comprise the step of reporting 218 the first measurements and/or the second measurements to a network node, such as an O&M node or the second base station 33.

The measurement related rule may define how to use the measurements based on the type of measurements performed, e.g. RRM measurements, timing measurements etc. Further, the measurement-related rule may define how to use the measurements based on the reason for the change from the first measurement configuration to the second measurement configuration.

The first measurements and the second measurements may be used in different ways. According to one embodiment, the first measurements are combined 212 with the second measurements. The first and the second measurements may be combined, for example, if a value of a measurement characteristic, such as a measurement time period of the first measurements is above a threshold, According to another embodiment, only the second measurements are used 214, and the first measurements are dropped. For example, the first measurements may be dropped and only the second measurements may be used if a value of a measurement characteristic, such as a measurement time period of the first measurements is below a threshold. According to another embodiment, the method further comprises indicating, e.g. by reporting, e.g. to the network node, that the first measurements have been dropped.

According to yet another embodiment, the second measurements are used 216 separately from the first measurements. The first and the second measurements may be used separately for example if the second measurements are performed over sufficiently long period of time and they may still have an acceptable accuracy e.g. 1-2 dB degraded with respect to the pre-defined minimum accuracy requirements. In this case the first and/or the second measurements can be used for some long term functions such as collecting measurement statistics for network planning and tuning of parameters.

Further, the first and/or the second measurements may be reported to a network node, such as an O&M node or the second base station 33. To report the first and/or the second measurements to the network node, such as the second base station 33 may be a way of using the measurements according to the different embodiments 212, 214 and 216 above.

Further, according to another embodiment it may also be possible to report to the network node whether the first measurements and the second measurements are combined, dropped or used separately.

According to yet another embodiment, detecting 204 a change to a second measurement configuration is accomplished when receiving the second measurement configuration from the network node, when detecting a cell change, when detecting a triggering event or when fulfilling a triggering condition.

According to another embodiment, a measurement time for performing measurements according to the first measurement configuration and/or the second measurement configuration is extended compared to if only the first measurement configuration were used. Thereby, a measurement node, such as a UE, is allowed to spend more time for a measurement if a change in measurement configuration occurs during the measurement compared to if no change occurs during the measurement. This may enhance the quality of the measurement.

Let us go back to FIG. 14 which describes a measuring node 100. According to an embodiment, the measuring node 100 is arranged for handling measurements performed on signals received over a wireless interface in a wireless communication system. The measuring node 100 comprises: a measuring unit 112 configured to perform measurements on received signals according to a first measurement configuration, and to perform measurements on received signals according to a second measurement configuration; and a processor 118 configured to detect a change from the first measurement configuration to the second measurement configuration, and to use the first measurements and the second measurements for radio resource management tasks.

According to another embodiment, the processor 118 is further arranged to identify how to use the first measurements and the second measurements according to a defined measurement-related rule pertaining to handling of measurements.

According to yet another embodiment, the processor 118 is further arranged to identify how to use the first measurements and the second measurements based on at least one of the following measurement data: measurement type, a value of a measurement characteristic, whether the measurements performed are downlink or uplink measurements and reason for the change of measurement configuration.

According to another embodiment, the processor 118 is further arranged to identify how to use the first measurements and the second measurements based on a first steady state before changing from the first measurement configuration to the second measurement configuration and a second steady state after changing from the first measurement configuration to the second measurement configuration.

According to another embodiment, the processor 118 is further arranged to report an indication of the first steady state and the second steady state, e.g. to the network node. The processor 118 may also be arranged to report 218 the first measurements and/or the second measurements to the network node.

The measurement related rule may define how to use the measurements based on the type of measurements performed, e.g. RRM measurements, timing measurements etc. Further, the measurement-related rule may define how to use the measurements based on the reason for the change from the first measurement configuration to the second measurement configuration.

According to another embodiment, the processor 118 is further arranged to use the measurements performed according to the first measurement configuration if a value of a measurement characteristic is above a threshold.

The processor 118 is further arranged for using the first measurements and the second measurements in different ways. According to one embodiment, the processor 118 is arranged to combine the first measurements with the second measurements, for example, if the value of the measurement characteristic, such as a measurement time period of the first measurements is above the threshold. According to another embodiment, the processor 118 is arranged to use only the second measurements, and to drop the first measurements. For example, the first measurements may be dropped and only the second measurements may be used if the value of the measurement characteristic, such as a measurement time period of the first measurements is below the threshold. According to another embodiment, the processor 118 is arranged to report, e.g. to the network node, that the first measurements have been dropped.

According to yet another embodiment, the processor 118 is arranged to use the second measurements separately from the first measurements.

According to yet another embodiment, the processor 118 is arranged to report the first and/or the second measurements to the network node.

According to another embodiment, the processor 118 is arranged to report to the network node whether the first measurements and the second measurements are combined, dropped or used separately.

According to yet another embodiment, the processor 118 is arranged to detect a change to a second measurement configuration when receiving the second measurement configuration from the network node, when detecting a cell change, when detecting a triggering event or when fulfilling a triggering condition.

According to yet another embodiment, the processor 118 is arranged to extend a measurement time for performing measurements according to the first measurement configuration and/or the second measurement configuration compared to if only the first measurement configuration were used.

Figure 17:
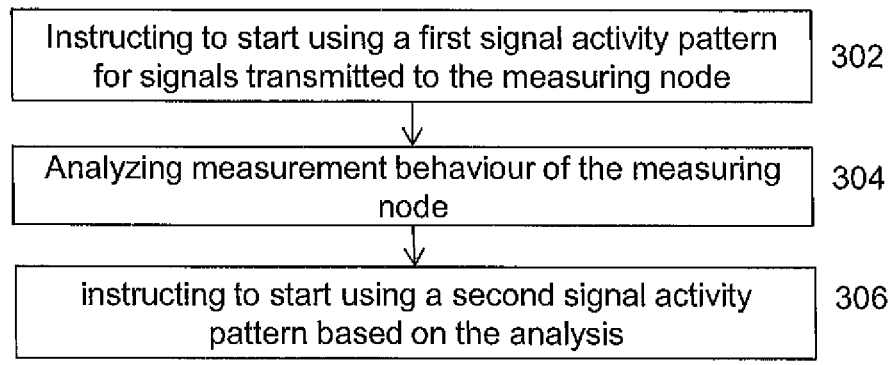
FIG. 17 is a flow chart illustrating a procedure in a network node for controlling a change of signal activity pattern for signals transmitted from the network node to a measuring node.

FIG. 17 describes a method in a network node 400 for controlling a change of signal activity pattern for signals transmitted from the network node to a measuring node, according to an embodiment. The method comprises: instructing 302 the measuring node or a transmit unit 404 of the network node to start using a first signal activity pattern for signals transmitted to the measuring node, analyzing 304 measurement behaviour of the measuring node, and instructing 306 the measuring node or a transmit unit 404 of the network node to start using a second signal activity pattern based on the analysis. By such a method it is possible to dynamically use a first and a second signal activity pattern. Further, it is possible to decide a proper time for changing signal activity pattern from the first to the second signal activity pattern, as well as to optimize the second signal activity pattern configuration, without for example losing valuable measurement results or wasting measuring node resources and measurement time.

The measuring node may be a UE, an eNodeB, a radio measurement unit or a location measurement unit. For the case that the measuring node is a UE, it may be possible to avoid doing handover of the UE to another cell until the ongoing measurements are completed. When a decided time for changing signal activity pattern is too short, the network node may decide to postpone the time to change signal activity pattern. The decision may depend e.g. on the pattern characteristic and measurement type. The network node may be a base station, e.g. eNodeB, a relay or a positioning node for example. Further, the term "instructing" may also be understood as "providing with a pattern" or "indicating to start using a pattern" or similar.

According to an embodiment, the method further comprises instructing the measuring node to abort the measurements performed according to the first signal activity pattern based on the analysis.

According to another embodiment the method further comprises the network node 400 controlling an event that may trigger the need for instructing 306 the measuring node or a transmit unit 404 of the network node to start using a second signal activity pattern. The event may be e.g. configuring handover, DRX, positioning session etc.

According to an embodiment, to analyze 304 measurement behaviour of the measuring node comprises analyzing measurements performed by the measuring node on the signals received according to the first signal activity pattern.

According to another embodiment, instructing 302 the measuring node or a transmit unit 404 of the network node to start using a first signal activity pattern comprises instructing the measuring node 100 to start using a first measurement pattern, and instructing 306 the measuring node or a transmit unit 404 of the network node to start using a second signal activity pattern comprises instructing the measuring node to start using a second measurement pattern based on the analysis.

According to another embodiment, instructing 302 the measuring node or a transmit unit 404 of the network node to start using a first signal activity pattern comprises instructing the transmit unit of the network node 400 to start using a first transmit pattern, and instructing 306 the measuring node or a transmit unit 404 of the network node to start using a second signal activity pattern comprises instructing the transmit unit 404 of the network node to start using a second transmit pattern based on the analysis.

According to yet another embodiment, the measurement behavior is analyzed 304 based on measurement type, signal activity pattern characteristics and/or state transition information.

According to yet another embodiment, the measurement behavior is analyzed 304 based on a predefined rule for measurement type, signal activity pattern characteristics and/or state transition information.

According to yet another embodiment, instructing 306 the measuring node 100 or a transmit unit 404 of the network node to start using a second signal activity pattern comprises instructing the measuring node 100 or the transmit unit 404 of the network node a time, or point of time, to start using the second signal activity pattern.

Figure 18:
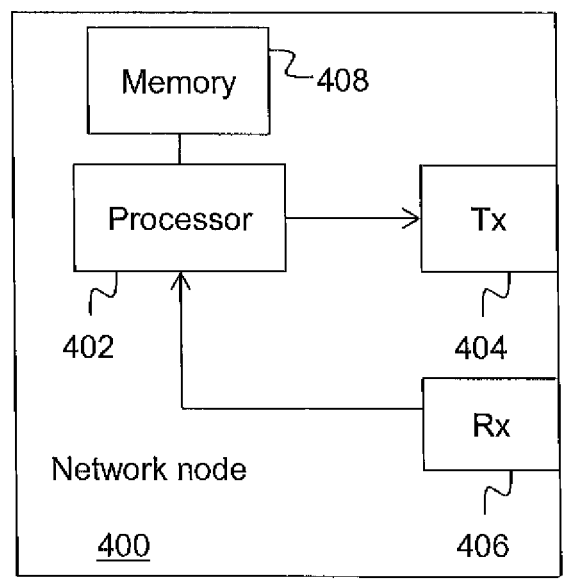
FIG. 18 is a schematic block diagram of a network node according to an embodiment.

FIG. 18 describes a network node 400 comprising a processor 402, a transmit unit 404, a receive unit 406 and a memory 408. The processor 402 is connected to the memory 408, the transmit unit 404 and the receive unit 406. The processor 402 may be any kind of logic unit. The transmit unit 404 is arranged for transmitting signals to e.g. a measuring node 100. The receive unit 406 is arranged for receiving signals from e.g. the measuring node 100.

According to an embodiment, the network node 400 is arranged for controlling a change of signal activity pattern for signals transmitted from the network node 400 to a measuring node 100. The processor 402 is arranged for instructing the measuring node 100 or the transmit unit 404 of the network node 400 to start using a first signal activity pattern for signals transmitted to the measuring node 100, analyzing measurement behavior of the measuring node 100 and instructing the measuring node 100 or the transmit unit 404 of the network node 400 to start using a second signal activity pattern based on the analysis.

The processor 400 may instruct the measuring node 100 by sending an instruction via its transmit unit 404, which instruction is sent by the transmit unit via a communication interface such as a wireless interface. The network node 400 may further have one or more functions and/or features in common with the eNodeB 32 shown in FIG. 12. For example, the transmit unit 404 and the receive unit 406 may be arranged as a common transceiver unit, as transceiver 73.

According to an embodiment, the processor 402 may further be arranged to instruct the measuring node 100 to abort the measurements performed according to the first signal activity pattern based on the analysis.

According to another embodiment the processor 402 may further be arranged to control an event that may trigger the need for instructing 306 the measuring node 100 or a transmit unit 404 of the network node 400 to start using a second signal activity pattern. The event may be e.g. configuring handover, DRX, positioning session etc.

According to an embodiment, the processor 402 may be arranged to analyze measurement behavior of the measuring node by analyzing measurements performed by the measuring node 100 on the signals received according to the first signal activity pattern. For this reason, the measuring node 100 sends the measurements performed according to the first signal activity pattern to the network node. The measurement may be sent together with information of the measurement type. Subsequently, the network node receives the measurements performed by the measuring node at its' receive unit 406, which measurements are forwarded to the processor 406 for processing and possible storage in the memory 408. Based on the received measurements, the processor 402 analyzes measurement behavior of the measuring node and decides at which time and if it is time for the measuring node to start using a second signal activity pattern.

According to another embodiment, the processor 402 is arranged to instruct the measuring node 100 or a transmit unit 404 of the network node 400 to start using the first signal activity pattern by instructing the measuring node 100 to start using a first measurement pattern. The processor is further arranged to instruct the measuring node 100 or a transmit unit 404 of the network node 400 to start using the second signal activity pattern by instructing the measuring node to start using a second measurement pattern based on the analysis.

According to another embodiment, the processor 402 is arranged to instruct the measuring node 100 or the transmit unit 404 of the network node to start using a first signal activity pattern by instructing the transmit unit of the network node 400 to start using a first transmit pattern. The processor is further arranged to instruct the measuring node 100 or the transmit unit 404 of the network node to start using teh second signal activity pattern by instructing the transmit unit of the network node to start using a second transmit pattern based on the analysis.

According to yet another embodiment, the processor 402 is arranged to analyze measurement behavior based on measurement type, signal activity pattern characteristics and/or state transition information. Such information may be known by the processor beforehand and stored e.g. in the memory or it may be communicated from the measuring node 100.

According to yet another embodiment, the processor 402 is arranged to analyze measurement behavior based on a predefined rule for measurement type, signal activity pattern characteristics and/or state transition information. The predefined rule may be stored in the memory 408.

According to yet another embodiment, the processor 402 is arranged to instruct the measuring node 100 or the transmit unit 404 of the network node to start using a second signal activity pattern by instructing the measuring node or a transmit unit 404 of the network node a time, or time point, to start using the second signal activity pattern.

The measurement behavior of the measuring node may relate to how the measurements are performed at the measuring node, for example which signal activity pattern that is used, which measurements that are used, e.g. reported to the network node, whether first and second measurements are combined etc. The measurement behavior of the measuring node may also relate to the quality of the measurements performed by the measuring node.

As mentioned above, dynamic pattern reconfiguration, i.e. a change of measurement configuration, introduces situations that need to be handled properly in the wireless communication system. It is important to define how a measuring node, such as a user equipment, UE, behaves in such a situation since otherwise if measurements are restarted every time when a change of measurement configuration occurs there is a risk that radio resource management such as UE and network performance is degraded. To not use dynamic pattern configuration may also degrade network performance and would be too restrictive for the advanced wireless technology. By using both measurements performed before and after a state transition for radio resource management tasks, UE and network performance may be kept on a high level even at dynamic pattern reconfiguration.

The above-described example embodiments are intended to be illustrative in all respects, rather than restrictive, of the embodiments of the present invention. All such variations and modifications are considered to be within the scope of the present disclosure as defined by the following claims. No element, act, or instruction used in the description of the present application should be construed as critical or essential to the invention unless explicitly described as such. Also, as used herein, the article "a" is intended to include one or more items.

The invention claimed is:

1. A method in a measuring node for handling measurements performed on signals received over a wireless interface in a wireless communication system, comprising:
performing measurements on received signals according to a first measurement configuration to obtain first measurements;
detecting a state transition from the first measurement configuration to a second measurement configuration has occurred;
performing measurements on received signals according to the second measurement configuration to obtain second measurements, wherein at least one of the first measurement configuration and the second measurement configuration comprises a signal activity pattern;
identifying a defined measurement-related rule for how to handle measurements after the state transition to the second-measurement configuration;
based on the defined measurement related rule for how to handle the measurements after the state transition, using the first measurements and the second measurements, wherein using the first measurements and the second measurements comprises:
using the first measurements and the second measurements to perform radio resource management tasks when the defined measurement related rule indicates that the first measurements and the second measurements are to be combined;

dropping the first measurements and using the second measurements to perform the radio resource management tasks when the defined measurement related rule indicates that the first measurements are to be dropped; and using the first measurements and the second measurements separately when the defined measurement related rule indicates that the first measurements and the second measurements are to be used separately; and transmitting a report to a network node, the report indicating whether the first measurements were combined with the second measurements, whether the first measurements were dropped and not used, and whether the first measurements were used separately from the second measurements based on the defined measurement related rule for how to handle the measurements after the state transition.

2. Method according to claim 1, wherein the radio management tasks are any one or more of: performing a cell selection, performing a cell reselection, reporting performed measurements to a network node.

3. Method according to claim 1, wherein the signal activity pattern is any one of a transmit pattern and a measurement pattern.

4. Method according to claim 1, wherein the rule identifies how to use the measurements performed according to the first measurement configuration and the second measurement configuration based on at least one of the following measurement data: measurement type, a value of a measurement characteristic, whether the measurements performed are downlink or uplink measurements and a reason for the change of measurement configuration.

5. Method according to claim 1, wherein the rule identifies how to use the measurements performed according to the first measurement configuration and the second measurement configuration based on a first steady state before changing from the first measurement configuration to the second measurement configuration and a second steady state after changing from the first measurement configuration to the second measurement configuration.

6. Method according to claim 1, wherein the measurements performed according to the first measurement configuration are used if the value of a measurement characteristic is above a threshold.

7. Method according to claim 6, wherein the measurement characteristic is a measurement time period, a signal strength or an error rate for the received signal.

8. Method according to claim 1, wherein detecting a change to the second measurement configuration is accomplished when receiving the second measurement configuration from the network node, when detecting a cell change, when detecting a triggering event or when fulfilling a triggering condition.

9. Method according to claim 1, wherein a measurement time for performing measurements according to the first measurement configuration and/or the second measurement configuration is extended compared to if only the first measurement configuration were used.

10. A measuring node for handling measurements performed on signals received over a wireless interface in a wireless communication system, comprising:

a measuring unit arranged to perform measurements on received signals according to a first measurement configuration to obtain first measurements, and for performing measurements on received signals according to a second measurement configuration to obtain second measurements, wherein at least one of the first measurement configuration and the second measurement configuration comprises a signal activity pattern, and a processor arranged to:

detect a state transition from the first measurement configuration to the second measurement configuration, identify a defined measurement-related rule for how to handle measurements after the state transition to the second measurement configuration, based on the defined measurement related rule for how to handle the measurements after the state transition, use the first measurements and the second measurements, wherein using the first measurements and the second measurements comprises:

using the first measurements and the second measurements to perform radio resource management tasks when the defined measurement related rule indicates that the first measurements and the second measurements are to be combined, dropping the first measurements and using the second measurements to perform the radio resource management tasks when the defined measurement related rule indicates that the first measurements are to be dropped, and using the first measurements and the second measurements separately when the defined measurement related rule indicates that the first measurements and the second measurements are to be used separately, and transmit a report to a network node, the report indicating whether the first measurements were combined with the second measurements, whether the first measurements were dropped and not used, and whether the first measurements were used separately from the second measurements based on the defined measurement related rule for how to handle the measurements after the state transition.

11. Measuring node according to claim 9, wherein the processor is further arranged to use the measurements performed according to the first measurement configuration if a value of a measurement characteristic is above a threshold.

12. Method in a network node for controlling a change of signal activity pattern for signals transmitted from the network node to a measuring node, comprising:

instructing the measuring node or a transmit unit of the network node to use a first measurement configuration defining a first signal activity pattern for performing a set of first measurements on signals transmitted to the measuring node;

analyzing measurement behaviour of the measuring node;

instructing the measuring node or the transmit unit of the network node to perform a state transition from the first measurement configuration to a second measurement configuration defining a second signal activity pattern for performing a set of second measurements on the signals transmitted to the measuring node;

instructing the measurement node or the transmit unit of the network node to use a defined measurement-related rule for handling measurements after the state transition to the second measurement configuration, wherein the defined measurement-related rule instructs the measurement node or the transmit unit of the network node to:
  use the first measurements and the second measurements to perform radio resource management tasks when the defined measurement related rule indicates that the first measurements and the second measurements are to be combined,
  drop the first measurements and using the second measurements to perform the radio resource management tasks when the defined measurement related rule indicates that the first measurements are to be dropped, and
  use the first measurements and the second measurements separately when the defined measurement related rule indicates that the first measurements and the second measurements are to be used separately, and
in response to instructing the measurement node or the transmit unit of the network node to use the defined measurement-related rule, receiving a report indicating whether the first measurements were combined with the second measurements, whether the first measurements were dropped and not used, and whether the first measurements were used separately from the second measurements after the state transition.

13. Method according to claim 12, wherein analyzing measurement behaviour of the measuring node comprises analyzing measurements performed by the measuring node on the signals received according to the first signal activity pattern.

14. Method according to claim 13, further comprising instructing the measuring node to abort the measurements performed according to the first signal activity pattern based on the analysis.

15. Method according to claim 12, further comprising controlling an event that triggers a need for instructing the measuring node or the transmit unit of the network node to start using a second signal activity pattern.

16. Method according to claim 12, wherein instructing the measuring node or the transmit unit of the network node to start using the first signal activity pattern comprises instructing the measuring node to start using a first measurement pattern, and wherein instructing the measuring node or the transmit unit of the network node to start using the second signal activity pattern comprises instructing the measuring node to start using a second measurement pattern based on the analysis.

17. Method according to claim 12, wherein instructing the measuring node or the transmit unit of the network node to start using the first signal activity pattern comprises instructing the transmit unit of the network node to start using a first transmit pattern, and wherein instructing the measuring node or the transmit unit of the network node to start using the second signal activity pattern comprises instructing the transmit unit of the network node to start using a second transmit pattern based on the analysis.

18. Method according to claim 12, wherein instructing the measuring node or the transmit unit of the network node to start using the second signal activity pattern comprises instructing the measuring node or the transmit unit of the network node a time to start using the second signal activity pattern.

19. A network node for controlling a change of signal activity pattern for signals transmitted from the network node to a measuring node, comprising:
  a processor arranged for:
    instructing the measuring node or a transmit unit of the network node to perform a state transition from the first measurement configuration to a first measurement configuration defining a first signal activity pattern for performing a set of first measurements on signals transmitted to the measuring node;
    analyzing measurement behaviour of the measuring node;
    instructing the measuring node or the transmit unit of the network node to perform a state transition to a second measurement configuration defining a second signal activity pattern for performing a set of second measurements on the signals transmitted to the measuring node;
    instructing the measurement node or the transmit unit of the network node to use a defined measurement-related rule for handling measurements after the state transition to the second measurement configuration, wherein the defined measurement-related rule instructs the measurement node or the transmit unit of the network node to:
      use the first measurements and the second measurements to perform radio resource management tasks when the defined measurement related rule indicates that the first measurements and the second measurements are to be combined,
      drop the first measurements and using the second measurements to perform the radio resource management tasks when the defined measurement related rule indicates that the first measurements are to be dropped, and
      use the first measurements and the second measurements separately when the defined measurement related rule indicates that the first measurements and the second measurements are to be used separately, and
    in response to instructing the measurement node or the transmit unit of the network node to use the defined measurement-related rule, receiving a report indicating whether the first measurements were combined with the second measurements, whether the first measurements were dropped and not used, and whether the first measurements were used separately from the second measurements after the state transition.

* * * * *